(12) United States Patent
Poshtkouhi et al.

(10) Patent No.: US 9,673,719 B2
(45) Date of Patent: Jun. 6, 2017

(54) DUAL ACTIVE BRIDGE WITH FLYBACK MODE

(71) Applicant: The Governing Council of the University of Toronto, Toronto (CA)

(72) Inventors: Shahab Poshtkouhi, Toronto (CA); Olivier Trescases, Toronto (CA)

(73) Assignee: The Governing Council of the University of Toronto, Toronto (CA)

( * ) Notice: Subject to any disclaimer, the term of this patent is extended or adjusted under 35 U.S.C. 154(b) by 71 days.

(21) Appl. No.: 14/517,427

(22) Filed: Oct. 17, 2014

(65) Prior Publication Data

US 2015/0109827 A1 Apr. 23, 2015

Related U.S. Application Data

(60) Provisional application No. 61/892,402, filed on Oct. 17, 2013.

(51) Int. Cl.
*H02M 3/335* (2006.01)

(52) U.S. Cl.
CPC ...... *H02M 3/33584* (2013.01); *H02M 3/3353* (2013.01)

(58) Field of Classification Search
CPC ......... H02M 3/33584; H02M 3/33592; H02M 5/275; H02M 2007/4815; Y02B 70/1433
USPC ........ 363/16–17, 21.04, 21.06, 21.08, 21.12, 363/97, 98, 127, 132
See application file for complete search history.

(56) References Cited

U.S. PATENT DOCUMENTS

| | | | | |
|---|---|---|---|---|
| 4,953,068 A * | 8/1990 | Henze | ............... | H02M 3/33584 363/127 |
| 5,027,264 A * | 6/1991 | DeDoncker | ....... | H02M 3/33584 363/129 |
| 5,500,791 A * | 3/1996 | Kheraluwala | ..... | H02M 3/33576 363/17 |
| 6,535,399 B2 * | 3/2003 | Gu | ........................ | H03F 1/0227 330/297 |

(Continued)

OTHER PUBLICATIONS

Denholm, P., et al.,"Bright Future, Solar Power as a Major Contributor to the U.S. Grid," IEEE Power & Energy Magazine, Feb. 20, 2013, pp. 22-32.

(Continued)

*Primary Examiner* — Rajnikant Patel
(74) *Attorney, Agent, or Firm* — Rahman LLC

(57) ABSTRACT

A dual active bridge (DAB) converter operates in a power conversion operation by controlling multiple bridge configured switches to charge a magnetization inductance from an input supply during a charge phase of a power cycle and to discharge the magnetization inductance into an output of the DAB during a discharge phase of the power cycle. The DAB converter includes an input converter connected to the input supply, an inductance connected to the input converter, a transformer comprising a primary and a secondary winding, and an output converter connected to the transformer. The input and output converters each include a first pair of switches forming a first circuit path, and a second pair of switches forming a second circuit path parallel to the first circuit path. The first and second circuit paths are both completed by a third circuit path including the inductance and the primary winding of the transformer.

27 Claims, 24 Drawing Sheets

(56) References Cited

U.S. PATENT DOCUMENTS

| | | | | |
|---|---|---|---|---|
| 7,778,045 B2* | 8/2010 | Alexander | .......... | H02M 3/1582 363/124 |
| 8,134,851 B2* | 3/2012 | Soldano | ............ | H02M 3/33592 363/127 |
| 8,363,427 B2* | 1/2013 | Anguelov | ......... | H02M 3/33584 363/127 |
| 8,446,745 B1* | 5/2013 | Alexander | ............ | H02M 5/275 361/54 |
| 8,811,039 B2* | 8/2014 | The Ngo | .......... | H02M 3/33584 363/21.02 |
| 8,929,103 B2* | 1/2015 | Brkovic | .................. | H01F 27/38 363/21.14 |
| 2004/0125618 A1* | 7/2004 | De Rooij | ................ | H02J 1/102 363/17 |
| 2006/0139823 A1* | 6/2006 | Shoji | ....................... | H02M 1/34 361/56 |
| 2007/0070655 A1* | 3/2007 | Eguchi | .................... | H02M 1/10 363/17 |

OTHER PUBLICATIONS

Hester, R., et al., "High Efficiency Wide Load Range Buck/Boost/Bridge Photovoltaic Microconverter," IEEE Applied Power Electronics Conference and Exposition, 2011, pp. 309-313.

York, B., et al., "An Integrated Boost Resonant Converter for Photovoltaic Applications," IEEE Transactions on Power Electronics, vol. 28, No. 3, Mar. 2013, pp. 1199-1207.

Erickson, R., et al., "A Microinverter for Building-Integrated Photovoltaics," IEEE Applied Power Electronics Conference and Exposition, 2009, pp. 911-917.

Femia, N., et al., "Distributed Maximum Power Point Tracking of Photovoltaic Arrays: Novel Approach and System Analysis," IEEE Transactions on Industrial Electronics, vol. 55, No. 7, Jul. 2008, pp. 2610-2621.

Poshtkouhi, S., et al., "A General Approach for Quantifying the Benefit of Distributed Power Electronics for Fine Grained MPPT in Photovoltaic Applications Using 3-D Modeling," IEEE Transactions on Power Electronics, vol. 27, No. 11, Nov. 2012, pp. 4656-4666.

Xu, L., et al., "Control and Operation of a DC Microgrid With Variable Generation and Energy Storage," IEEE Transactions on Power Delivery, vol. 26, No. 4, Oct. 2011, pp. 2513-2522.

Suvire, G., et al., "Improving the Integration of Wind Power Generation into AC Microgrids Using Flywheel Energy Storage," IEEE Transactions on Smart Grid, vol. 3, No. 4, Dec. 2012 pp. 1945-1954.

Alam, M., et al., "Mitigation of Rooftop Solar PV Impacts and Evening Peak Support by Managing Available Capacity of Distributed Energy Storage Systems," IEEE Transactions on Power Systems, vol. 28, No. 4, Nov. 2013, pp. 3874-3884.

Liu, L., et al., "A Cascaded Photovoltaic System Integrating Segmented Energy Storages With Self-Regulating Power Allocation Control and Wide Range Reactive Power Compensation," IEEE Transactions on Power Electronics, vol. 26, No. 12, Dec. 2011, pp. 3545-3559.

Chen, Y., et al., "A High Step-Up Three-Port DC-DC Converter for Stand-Alone PV/Battery Power Systems," in IEEE Transactions on Power Electronics, vol. 28, No. 11, Nov. 2013, pp. 5049-5062.

Wang, Z., et al., "An Integrated Three-Port Bidirectional DC-DC Converter for PV Application on a DC Distribution System," IEEE Transactions on Power Electronics, vol. 28, No. 10, Oct. 2013, pp. 4612-4624.

Krismer, F., et al., "Efficiency-Optimized High-Current Dual Active Bridge Converter for Automotive Applications," IEEE Transactions on Industrial Electronics, vol. 59, No. 7, Jul. 2012, pp. 2745-2760.

Qin, H., et al., "Generalized Average Modeling of Dual Active Bridge DC-DC Converter," IEEE Transactions on Power Electronics, vol. 27, No. 4, Apr. 2012, pp. 2078-2084.

Park, M., et al., "A Study on the Optimal Voltage for MPPT Obtained by Surface Temperature of Solar Cell," The 30th Annual Conference of IEEE Industrial Electronics Society, vol. 3, Nov. 2-6, 2004, pp. 2040-2045.

Lu, D., et al., "A Single-Stage AC/DC Converter With High Power Factor, Regulated Bus Voltage, and Output Voltage," IEEE Transactions on Power Electronics, vol. 23, No. 1, Jan. 2008, pp. 218-228.

Hu, et al., "A Single-Stage Microinverter Without Using Eletrolytic Capacitors," IEEE Transactions on Power Electronics, vol. 28, No. 6, Jun. 2013, pp. 2677-2687.

\* cited by examiner

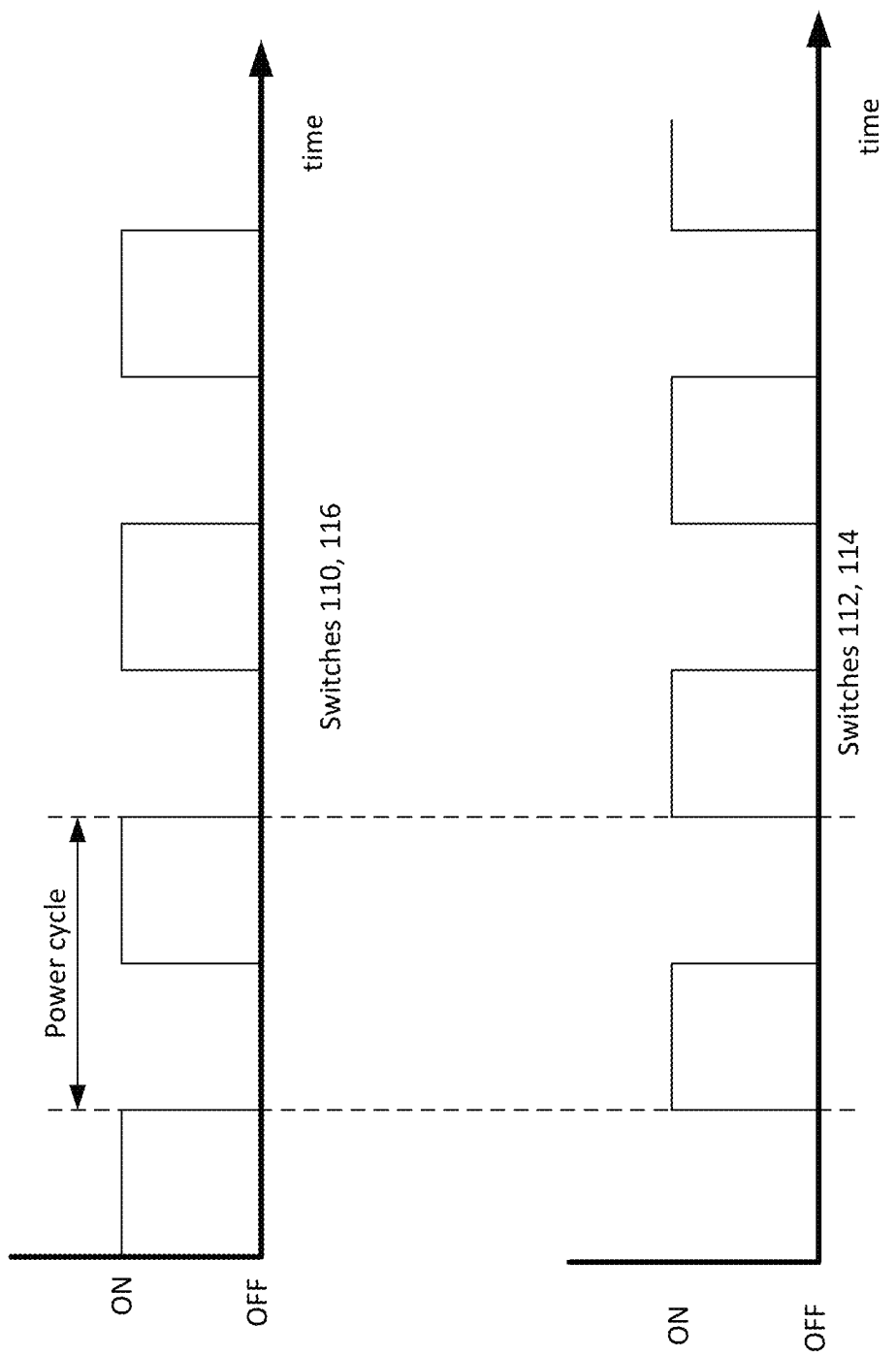

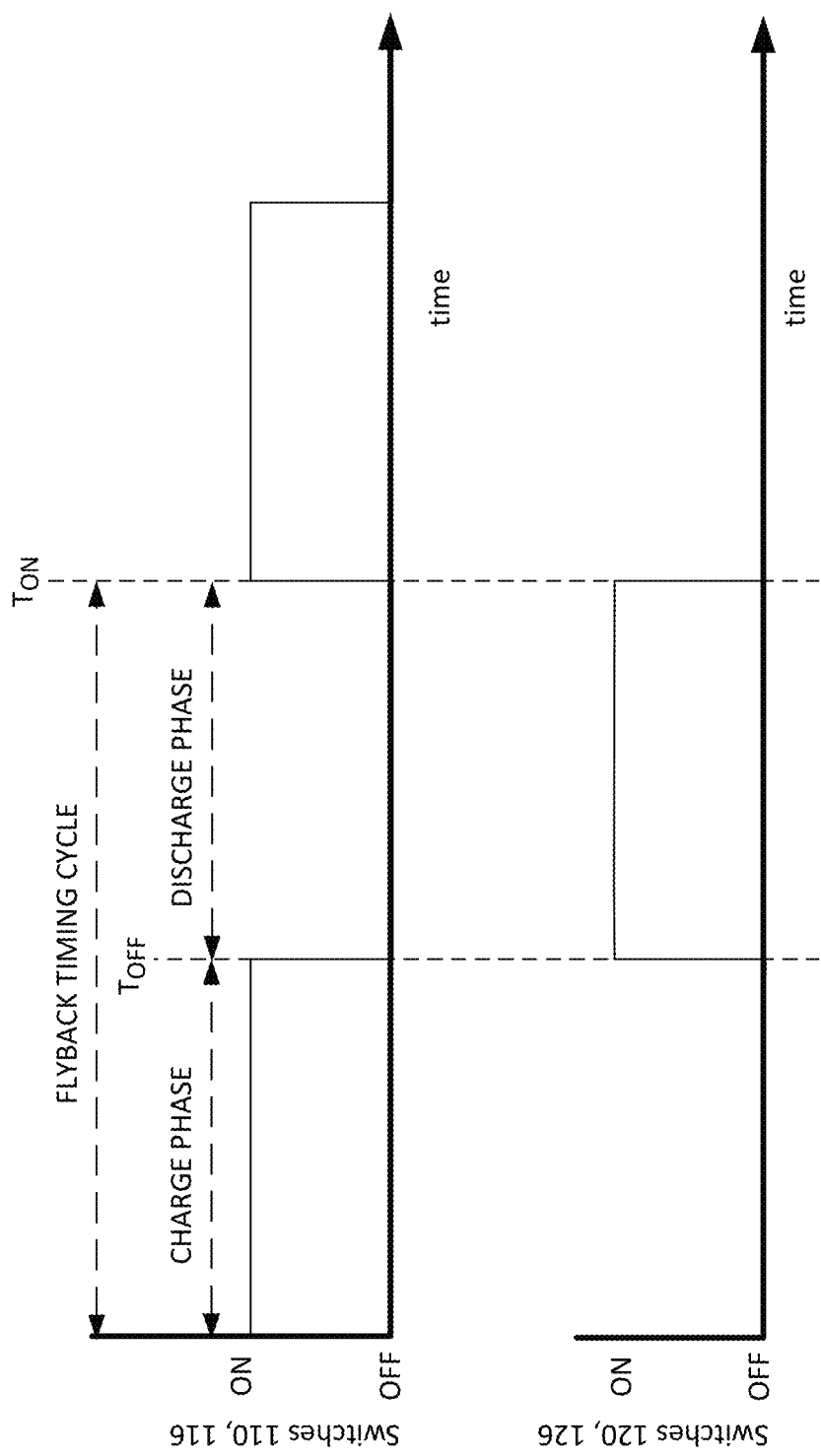

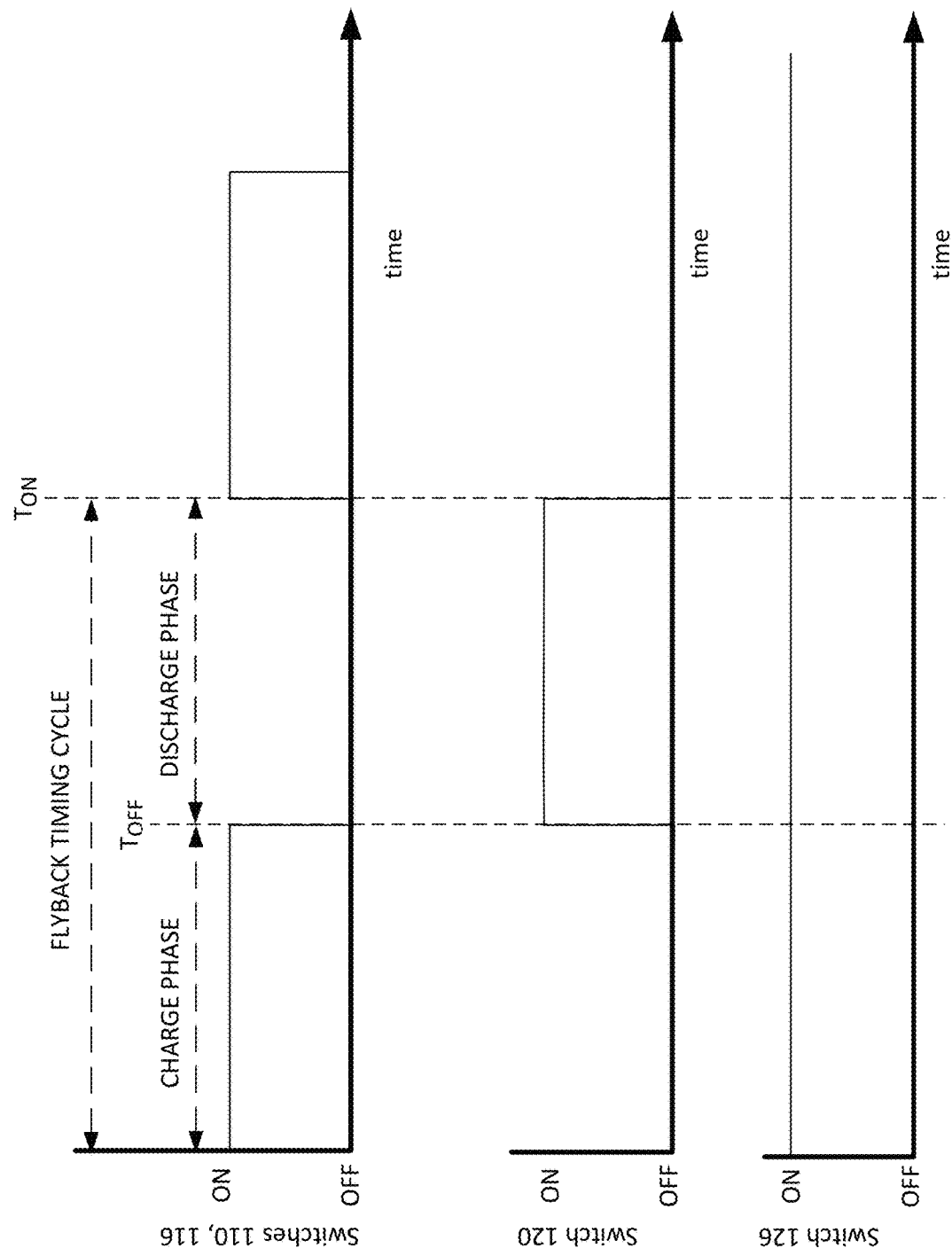

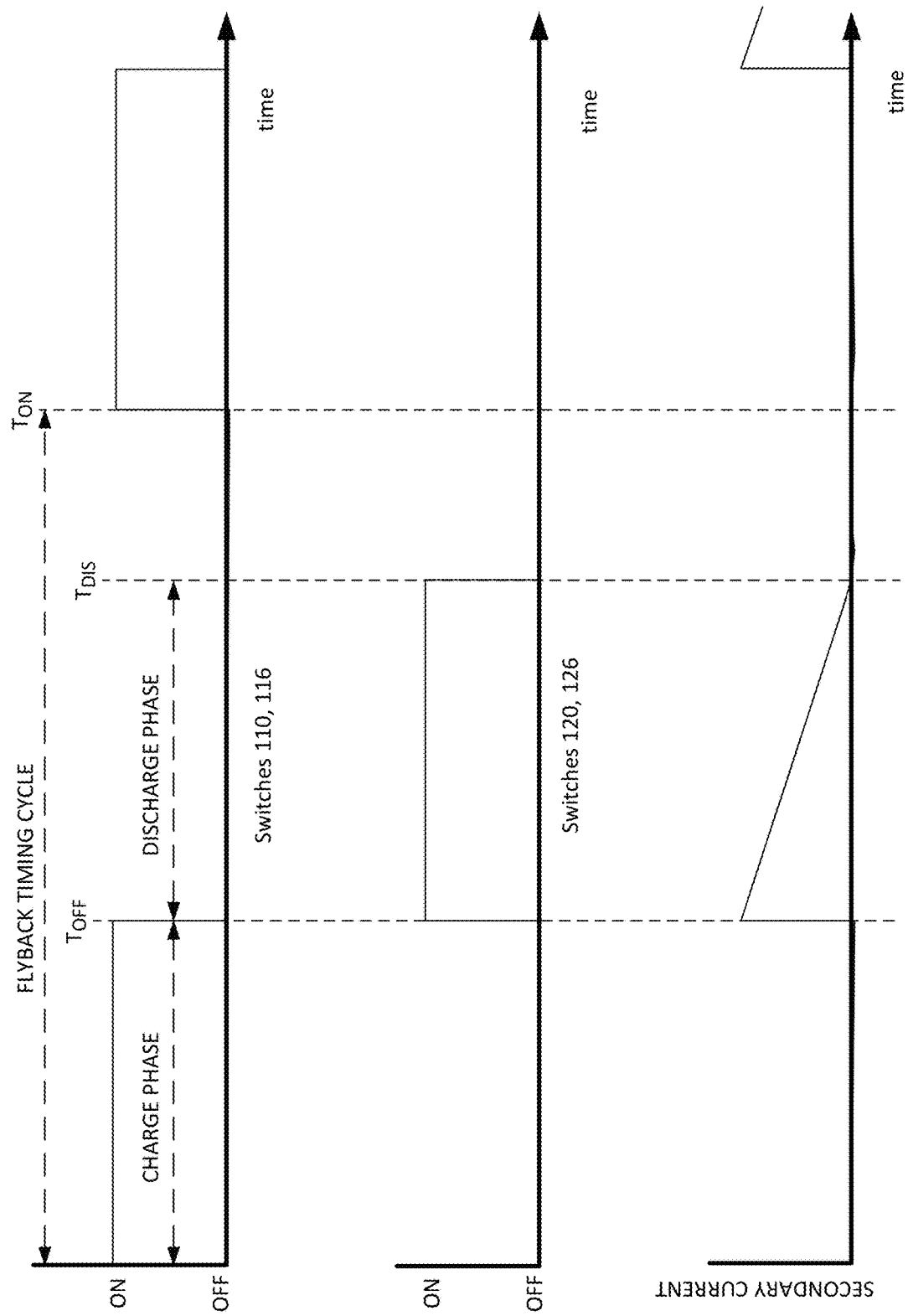

DUAL ACTIVE BRIDGE WITH FLYBACK MODE

CROSS-REFERENCE TO RELATED APPLICATIONS

This application claims priority to U.S. Provisional patent application Ser. No. 61/892,402 filed on Oct. 17, 2013, the complete disclosure of which, in its entirety, is hereby incorporated by reference.

BACKGROUND

Technical Field

The embodiments herein generally relate to power converters, and more particularly to power converters using Dual Active Bridge (DAB) topologies.

Description of the Related Art

DC to DC converters convert power at one DC input voltage to DC power at another output voltage. The input DC voltage could be unregulated while the DC output voltage could be regulated to a fixed value by the converter.

The continuous decline of photovoltaic (PV) module prices compounded with attractive feed-in tariffs in a variety of jurisdictions is leading to the rapid deployment of PV installations throughout the world. The intermittent nature of PV power, and thus the need for energy storage and/or load shedding, is a major challenge in small-scale PV based grids, even if power-quality and up-time requirements are reduced compared to conventional grids. Low-power DC-DC Micro-Converters (MIC) and AC-DC Micro-Inverters (MIV) provide high-granularity distributed Maximum Power Point Tracking (MPPT) at the module or sub-string level. This generally leads to increased robustness to clouds, dirt, and aging effects as well as irradiance and temperature gradients.

Existing MIV architectures satisfy the need for low capital cost and expandable AC generation, and there is a compelling argument to extend this technology to include small-scale distributed storage. A conventional MW based AC power system is shown in FIG. 1A. The Central Energy Storage System (ESS) is typically based on a high power centralized bi-directional AC-DC converter connected to a battery bank or a flywheel. Integrated storage helps to buffer the frequent insolation fluctuations, while also providing back-up power and reactive power support if needed. The industry has developed a low power, single-stage multi-port converter for PV and battery technologies. Moreover, the industry has developed a 3 kW interconnection of a battery pack and a PV module through an isolated DC-DC converter topology. The general architecture of a two-stage MIV with an integrated ESS is shown in FIG. 1B. While two-stage MIVs usually have slightly lower efficiency than single-stage MIVs, the high-voltage DC link capacitance, $C_{bus}$, can be used for AC power decoupling in single-phase systems, eliminating the need for electrolytic capacitors that limit the system reliability.

SUMMARY

In view of the foregoing, an embodiment herein provides a method of operating a dual active bridge (DAB) converter in a power conversion operation, the method comprising controlling a plurality of bridge configured switches to charge a magnetisation inductance from an input supply during a charge phase of a power cycle and to discharge the magnetisation inductance into an output of the DAB during a discharge phase of the power cycle. The DAB converter may comprise an input converter operatively connected to the input supply; an inductance operatively connected to the input converter; a transformer comprising a primary winding and a secondary winding, the transformer operatively connected to the inductance; and an output converter operatively connected to the transformer. Each of the input converter and the output converter may comprise a first pair of switches forming a first circuit path; and a second pair of switches forming a second circuit path parallel to the first circuit path, wherein the first circuit path and the second path are both completed by a third circuit path comprising the inductance and the primary winding of the transformer.

The method may further comprise configuring the inductance as any of a discrete inductor, a leakage inductance of the transformer, and a combination of a discrete inductor and a leakage inductance of the transformer. The input supply may comprise a photovoltaic (PV) panel. The method may further comprise operating the DAB converter in a power cycle, wherein during the power cycle the first pair of switches and the second pair of switches in each of the input converter and the output converter may be controlled to be active switches or inactive switches, wherein active switches may be switched during the power cycle. The first pair of switches or the second pair of switches in the input converter may be active switches, wherein one of the second pair of switches in the output converter may be an active switch. The method may further comprise controlling the switches to operate the DAB converter in a resonance phase, wherein the magnetising inductance resonates with a switch capacitance. The method may further comprise controlling a beginning of the charge phase to coincide with a minimum value in a switch capacitance voltage.

The magnetisation inductance may continuously charge or discharge, wherein a next power cycle begins before the magnetisation inductance fully discharges. Alternatively, the magnetisation inductance may continuously charge or discharge, wherein a next power cycle begins substantially simultaneously as the magnetisation inductance is fully discharged. Still alternatively, the magnetisation inductance may fully discharge prior to a next power cycle.

Each of the input converter and the output converter may comprise any of P-type and N-type metal-oxide-semiconductor field-effect transistors (MOSFETs) switches, and wherein the output converter further comprises a bi-directional switch. The bi-directional switch may comprise any of a pair of P-type and N-type MOSFETS sharing a common gate control signal. Each MOSFET may comprise an intrinsic diode between a source and a drain of the MOSFET. A pair of MOSFETs in the input converter may be active switches, wherein a pair of intrinsic diodes in the output converter may be active switches. The input converter may further comprise a bi-directional switch. The method may further comprise operating the DAB converter in the power cycle; and selecting a flyback mode of operation of the DAB converter when a power level of the DAB converter is between zero and a predetermined threshold power level value.

Another embodiment provides a DAB converter comprising a plurality of bridge configured switches configured to charge a magnetising inductance from an input supply during a charge phase of a power cycle and to discharge the magnetisation inductance into an output of the DAB during a discharge phase of the power cycle. The DAB converter may further comprise an input converter operatively connected to the input supply; an inductance operatively connected to the input converter; a transformer comprising a primary winding and a secondary winding, the transformer operatively connected to the inductance; and an output converter operatively connected to the transformer. Each of the input converter and the output converter may comprise a first pair of switches forming a first circuit path; and a second pair of switches forming a second circuit path parallel to the first circuit path, wherein the first circuit path and the second circuit path are both completed by a third circuit path comprising the inductance and a primary winding of the transformer.

The inductance may comprise any of a discrete inductor, a leakage inductance of the transformer, and a combination of a discrete inductor and a leakage inductance of the transformer. During the power cycle the first pair of switches and the second pair of switches in each of the input converter and the output converter may be controlled to be active switches or inactive switches, wherein active switches may be switched during the power cycle. The first pair of switches or the second pair of switches in the input converter may be active switches, wherein one of the second pair of switches in the output converter may be an active switch. Each of the input converter and the output converter may comprise any of P-type and N-type MOSFETs, wherein any of the input converter and the output converter may further comprise a bi-directional switch. The bi-directional switch in the input converter may comprise any of a pair of P-type and N-type MOSFETS sharing a common gate control signal. Each MOSFET may comprise an intrinsic diode between a source and a drain of the MOSFET. A pair of MOSFETs in the input converter may be active switches, wherein a pair of intrinsic diodes in the output converter may be active switches. The DAB converter may further comprise a control mechanism that selects a flyback mode of operation of the DAB converter when a power level of the DAB converter is between zero and a predetermined threshold power level value.

Another embodiment provides a DAB converter comprising an input converter and an output converter, the input and output converters each comprising a plurality of bridge configured switches, wherein at least one of the switches may be a bi-directional MOSFET switch.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3 is a switch control signal timing diagram for the input converter according to an embodiment herein;

FIG. 4A is a switch control signal timing diagram for operation of a DAB with a reduced number of active switches according to an embodiment herein;

FIG. 4B is a switch control signal timing diagram for operation of a DAB of a reduced active switch method according to an embodiment herein;

FIG. 4C is a switch control signal timing diagram for operation of a DAB in discontinuous flyback mode according to an embodiment herein;

DETAILED DESCRIPTION

Figure 1A:
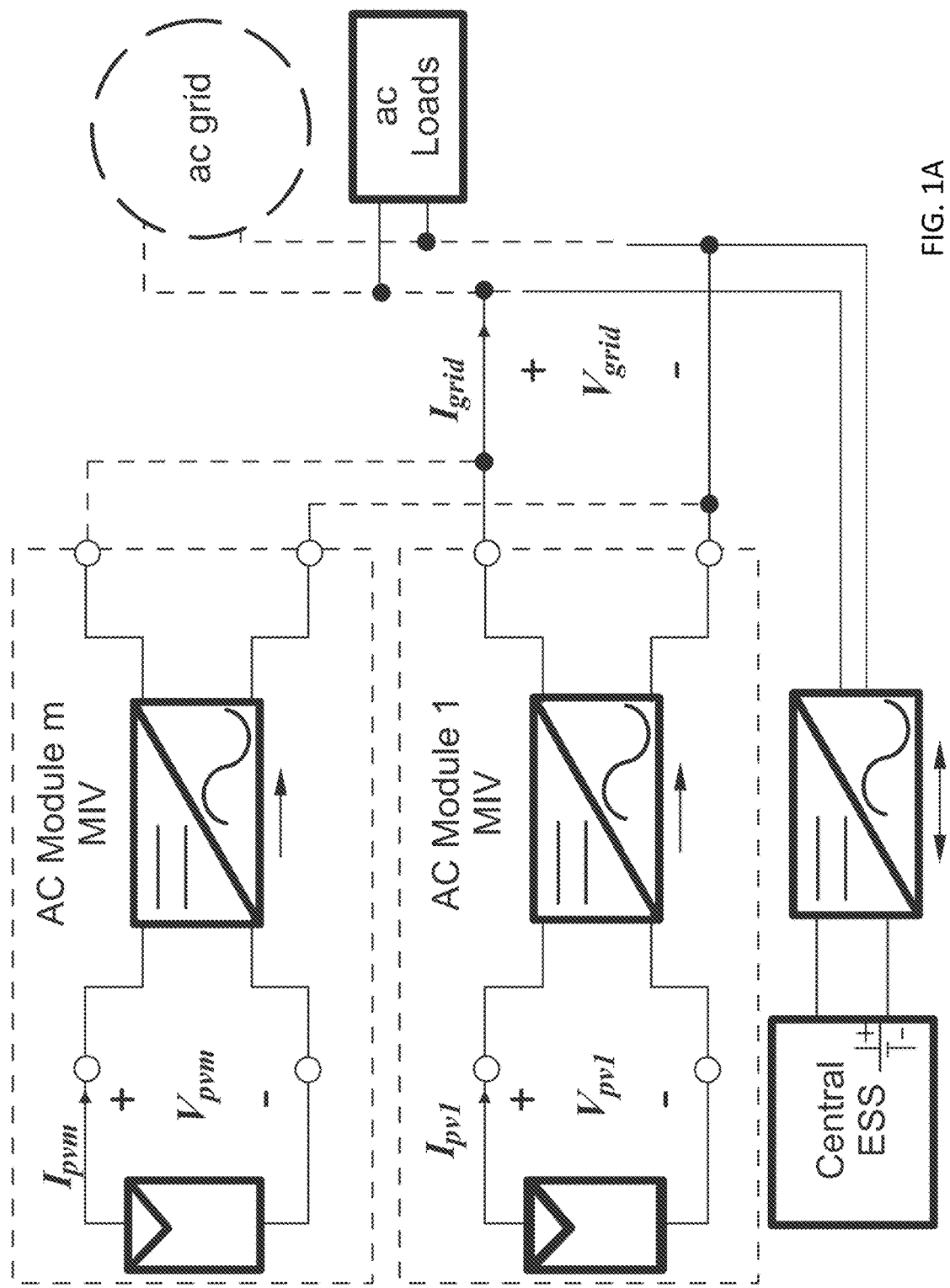
FIG. 1A is a schematic diagram of a conventional micro-inverter based PV system with central ESS.
Figure 1B:
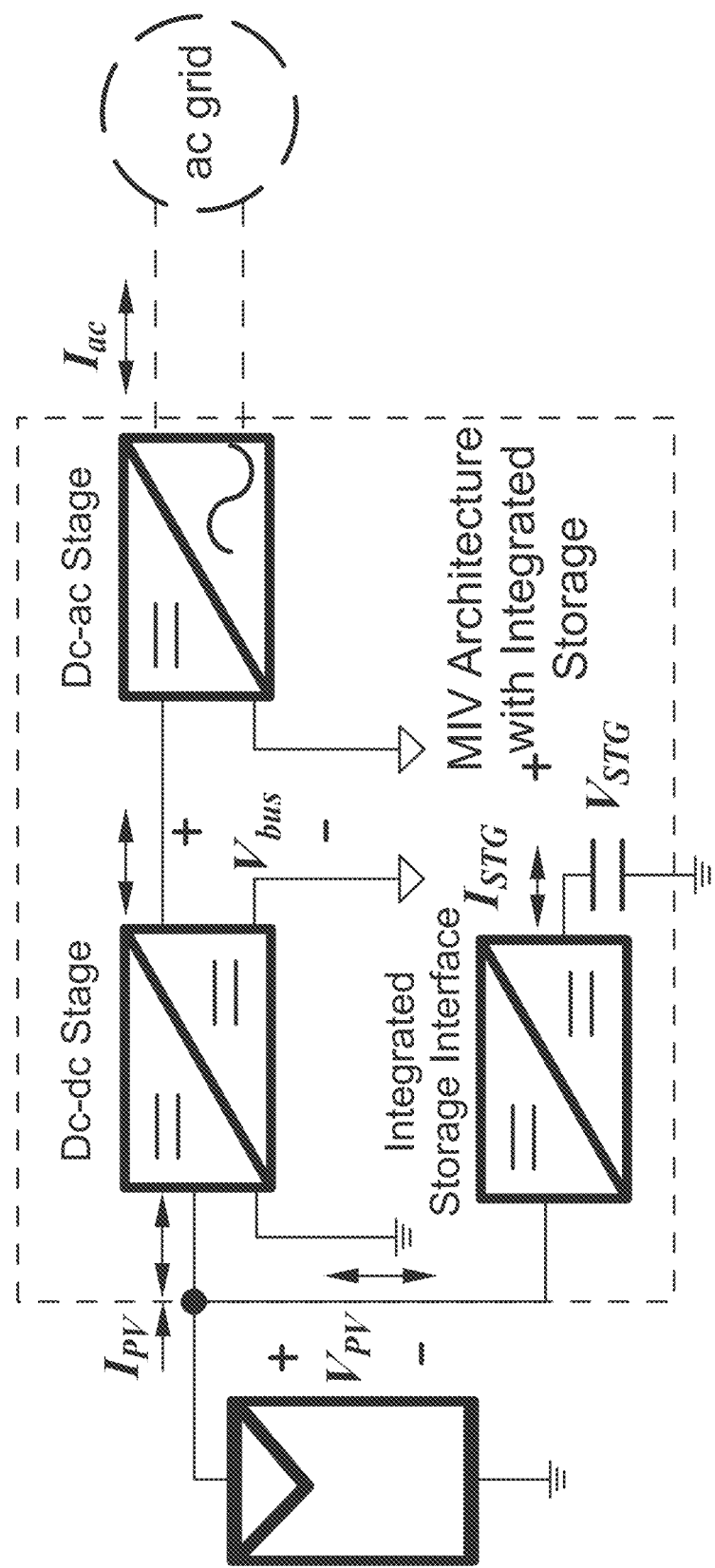
FIG. 1B is a schematic diagram of a conventional two-stage MIV architecture with integrated storage.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide an operating mode of a Dual Active Bridge (DAB) power converter having a reduced number of active switches. Referring now to the drawings, and more particularly to FIGS. 2 through 16B, where similar reference characters denote corresponding features consistently throughout the figures, there are shown preferred embodiments.

A popular power converter design is the Dual Active Bridge (DAB). In a DAB, an input converter comprising a plurality of active switching elements connected in a bridge configuration converts the DC input voltage to an Alternating Current (AC) voltage and supplies this to the primary winding of a transformer. The secondary winding of the transformer supplies the transformed AC voltage to an output converter. The output converter comprises a plurality of active switching elements connected in a bridge configuration and converts the AC voltage to a DC voltage. The DAB can be operated as a DC-to-DC converter or as a DC-to-AC converter by sinusoidally modulating the output voltage.

Figure 2:
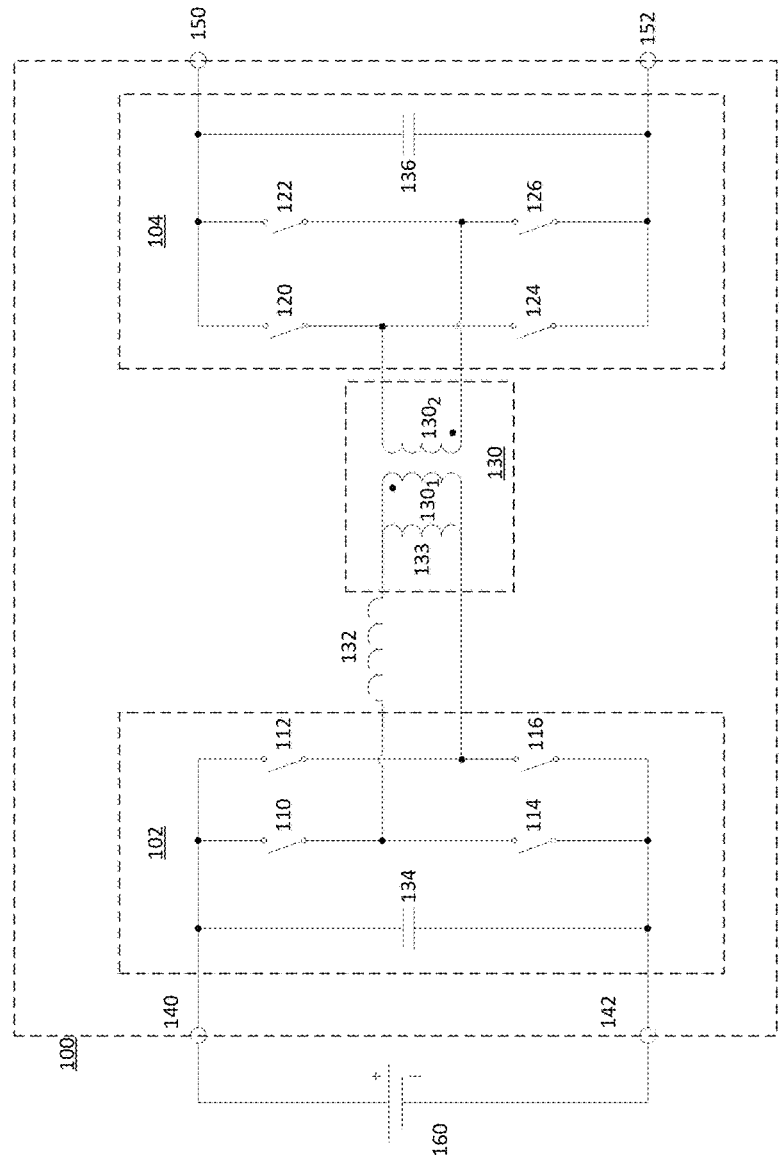
FIG. 2 is a schematic diagram of a DAB according to an embodiment herein.

FIG. 2 is a schematic diagram of a DAB 100. DAB 100 comprises input converter 102, output converter 104, transformer 130, inductor 132, input terminals 140, 142, and output terminals 150, 152. Transformer 130 comprises primary winding $130_1$ secondary winding $130_2$ and magnetisation inductance 133. Magnetisation inductance 133 represents the inherent energy storage properties of transformer 130 and is not a separate component or winding. Transformer 130 in FIG. 2 is shown as having anti-parallel windings (winding polarity is conventionally indicated by black dots) however it should be understood that a transformer with parallel windings could also be used in accordance with the embodiments herein.

Input converter 102 comprises switches 110, 112, 114, 116 and input capacitor 134. Switches 110, 112, 114, 116 are operatively connected in a bridge configuration. A bridge circuit configuration comprises two parallel circuit paths, both of which are completed or "bridged" by a third circuit path at an intermediate point along the circuit path. For example, in FIG. 2, switches 110, 116 form a first circuit path and switches 112, 114 form a second, parallel circuit path both of which are completed by the third circuit path comprising inductance 132 and primary winding $130_1$. Similarly, switches 120, 126 form a first circuit path and switches 122, 124 form a second, parallel circuit path both of which are completed by the third circuit path comprising secondary winding $130_2$. Output converter 104 comprises switches 120, 122, 124, 126 and output capacitor 136.

Inductance 132 in FIG. 2 could be a discrete inductor. In some embodiments however, inductance 132 might not be a discrete inductor and could instead be the leakage inductance of transformer 130. Leakage inductance results from the imperfect coupling between the primary and secondary windings of a transformer. It could be beneficial to use a transformer's leakage inductance for inductance 132 to reduce the circuit component count of the DAB 100. In other embodiments, inductance 132 is a combination of a discrete inductor and the transformer's leakage inductance. Input converter 102 receives a DC input voltage from DC supply 160 at input terminals 140, 142. DC supply 160 may comprise a battery, a fuel cell, or a photovoltaic (PV) panel.

Switches 110, 112, 114, 116 of input converter 102 are controlled to form a bridge circuit which inverts the input DC voltage, producing an AC voltage and providing it across inductance 132 and primary winding $130_1$. The switch control means has not been shown in FIG. 2. However, those skilled in the art would recognize that the operation of switches 110, 112, 114, 116 may be controlled by a standard control mechanism (not shown). Capacitor 134 provides storage and smoothing of the DC input voltage. Transformer 130 transforms the AC voltage supplied to primary winding $130_1$ into an AC voltage in secondary winding $130_2$. The magnitude of the secondary winding voltage is dependent on the turns ratio of the secondary winding to the primary winding and could be different from the magnitude of the voltage in the primary winding $130_1$.

Secondary winding $130_2$ is coupled to output converter 104. Switches 120, 122, 124, 126 of output converter 104 are controlled (e.g. by a standard control mechanism (not shown)) to form a second bridge circuit which rectifies the AC voltage and provides a DC voltage at output terminals 150, 152. Power transfer between input converter 102 and output converter 104 is controlled by varying the phase difference between the switching of the input bridge and the switching of the output bridge. Again, the switch control means has not been shown in FIG. 2. The DC voltage could be provided to a load such as, for example, a battery charger or to a further power conversion stage such as an inverter (not shown) operatively connected to output terminals 150, 152. Capacitor 136 provides storage and smoothing of the DC output voltage.

FIG. 3, with reference to FIG. 2, is a switch control signal timing diagram for the input converter 102 of FIG. 2. FIG. 3 shows the control signal for switches 110, 116 and switches 112, 114 during conventional DAB operation. An "ON" control signal closes a switch putting it in a conducting state. An "OFF" control signal opens a switch putting it into a non-conducting state.

During a single power cycle, switches 110 and 116 are controlled to be "ON" (conducting) while switches 112 and 114 are "OFF" (non-conducting), and switches 110 and 116 are controlled to be "OFF" when switches 112 and 114 are "ON". Primary winding $130_1$ is alternately coupled to DC supply 160 by switches 110, 116 and by switches 112, 114 on a power cycle producing a voltage of alternating polarity across primary winding $130_1$.

The operation of switches 120, 122, 124, 126 of output converter 104 is similar. During a single power cycle, switches 120 and 126 are controlled to be "ON" (conducting) while switches 122 and 124 are "OFF" (non-conducting), and switches 120 and 126 are controlled to be "OFF" when switches 122 and 124 are "ON". Secondary winding $130_2$ is alternately coupled to output terminals 150, 152 by switches 120, 126 and by switches 122, 124 on a power cycle producing an approximately DC voltage across terminals 150, 152.

An important operating parameter of a power converter is its efficiency. A power converter's efficiency is defined as its output power divided by its input power and expressed as a percentage. High values of efficiency could be a desirable converter parameter in some applications. Many DC power sources, such as for example PV panels could produce varying amounts of power depending on the time of day or weather conditions. It could therefore be important that a converter have high efficiency across a wide range of possible input powers.

DAB 100 operated according to the above described operating scheme and designed to handle the peak input power of a voltage source could have a reduced efficiency when operated at input powers in the range of zero to 40% of peak power. The inefficiency could be a result of switching losses from switching the eight switches (110, 112, 114, 116, 120, 122, 124, 126) in the DAB 100. It could be more efficient at low input powers to operate DAB 100 such that the number of active switches (switches that are switched during a power cycle) is reduced.

FIG. 4A, with reference to FIGS. 2 through 3, is a switch control signal timing diagram for operation of a DAB 100 according to a first embodiment of a reduced active switch method. FIG. 4A shows the control signals for switches 110, 116, 120, 126. In this reduced active switch method DAB 100 has an equivalent topology similar to a two transistor flyback converter and this operating mode of the DAB is referred to as flyback mode. In flyback mode, the DAB's switches are timed flyback timing cycle.

The beginning of the flyback timing cycle is referred to as the charge phase. During the charge phase, switches 110 and 116 are "ON" and primary winding 130$_1$ is coupled to DC supply 160. Switches 120 and 126 of output converter 104 are "OFF". Switches 112, 114, 122, 124 are "OFF" throughout the flyback cycle and their timing signals have not been shown. Current flows in primary winding 130$_1$ during the charge phase and energy is stored in magnetisation inductance 133. Secondary winding 130$_2$ is isolated by open switches 120, 122, 124, 126 and no secondary current flows.

At time "$T_{OFF}$" in FIG. 4A the charge phase of the flyback timing cycle ends and the discharge phase of the flyback timing cycle begins. Switches 110, 116 are turned "OFF" isolating primary winding 130$_1$. Switches 120, 126 are turned "ON" coupling secondary 130$_2$ to output terminals 150, 152. The primary current ceases and the energy stored in magnetisation inductance 133 during the charge phase is discharged into secondary winding 130$_2$ and secondary current flows.

FIG. 4B, with reference to FIGS. 2 through 4A, is a switch control signal timing diagram for operation of DAB 100 according to a second embodiment of a reduced active switch method. FIG. 4B shows the control signals for switches 110, 116, 120, 126. During the charge phase, switches 110 and 116 are "ON" and primary winding 130$_1$ is coupled to DC supply 160. Switch 120 is "ON" and switch 126 is "OFF". Switches 112, 114, 122, 124 are "OFF" throughout the entire flyback timing cycle and their control signals have not been shown. Current flows in primary winding 130$_1$ during the charge phase and energy is stored in magnetisation inductance 133. Secondary winding 130$_2$ is isolated by open switches 120, 122, 124 and no secondary current flows.

At time "$T_{OFF}$" in FIG. 4B the charge phase of the flyback timing cycle ends and the discharge phase of the flyback timing cycle begins. Switches 110, 116 are turned "OFF" isolating primary winding 130$_1$. Switch 120 remains "ON". Switch 126 is turned "ON" coupling secondary winding 130$_2$ to output terminals 150, 152. The primary current ceases and the energy stored in magnetisation inductance 133 during the charge phase is discharged into secondary winding 130$_2$ and secondary current flows.

This embodiment could have an advantage over the previously described embodiment in that there is one less active switch. Although switch 126 is described as being kept "ON" throughout the flyback cycle and switch 120 is described as switching "ON" during the discharge phase the opposite situation is also possible. Switch 120 could be kept "ON" throughout the flyback timing cycle and switch 126 could be switched "ON" during the discharge phase.

FIGS. 4A and 4B depict the operation of DAB 100 in a continuous flyback mode or boundary condition flyback mode. In continuous flyback mode, magnetisation inductance 133 is continuously charging or discharging. In continuous flyback mode, the next flyback timing cycle begins before magnetisation inductance 133 fully discharges. In boundary condition flyback mode, magnetisation inductance 133 is continuously charging or discharging and the next flyback timing cycle begins substantially simultaneously as the magnetisation inductance 133 is fully discharged.

FIG. 4C, with reference to FIGS. 2 through 4B, is a control signal timing diagram for operation of a DAB 100 in discontinuous flyback mode. In discontinuous mode, the magnetisation inductance discharges completely before the next flyback cycle begins. FIG. 4C shows the control signals of switches 110, 116, 120, 126 and the secondary current for operation of DAB 100 in discontinuous flyback mode. Switches 110, 116 are turned "OFF" at the beginning of the discharge phase and switches 120, 126 are turned "ON". Switches 112, 114, 122, 124 are "OFF" throughout the flyback timing cycle and their control signals have not been shown in the figures. At time $T_{DIS}$ the magnetisation inductance 133 has discharged completely, the secondary current falls to zero and switches 120, 126 are turned "OFF", isolating secondary winding 130$_2$. It is important to isolate the secondary winding to prevent the back flow of current from terminals 150, 152 or capacitor 136. At further time $T_{ON}$, switches 110, 116 are turned "ON" and the next flyback timing cycle begins. In FIG. 4C switches 120 and 126 are both active and switching during the flyback timing cycle according to the first embodiment of a reduced active switch method. In the second embodiment of a reduced active switch method one of switch 120, 126 is kept "ON" throughout the flyback timing cycle and the other of switch 120, 126 is switched "ON" at the beginning of the discharge cycle and switched "OFF" at time $T_{DIS}$.

Figure 5A:
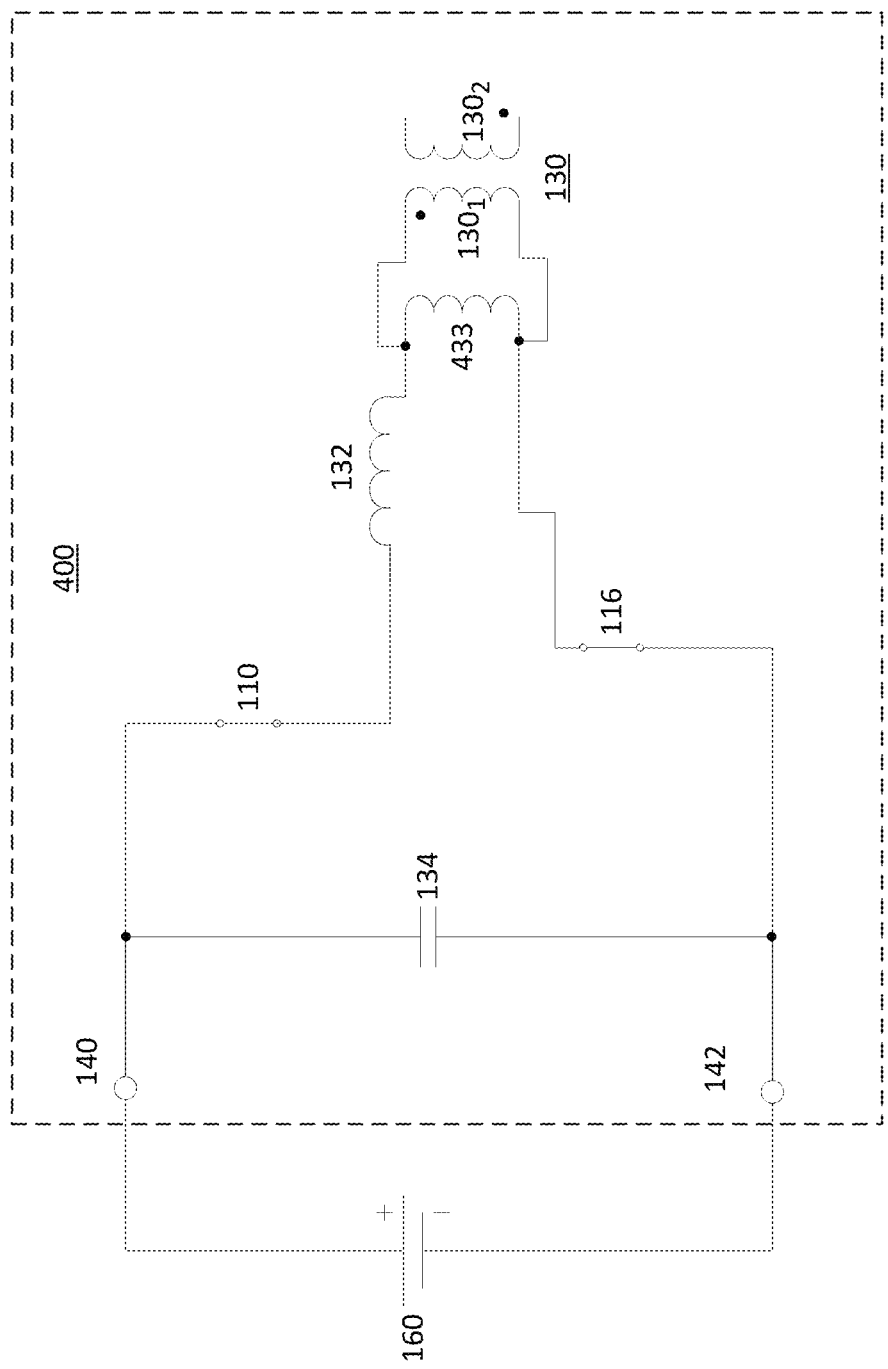
FIG. 5A is a circuit diagram of the equivalent circuit of the DAB during the charge phase of the flyback timing cycle according to an embodiment herein.

FIG. 5A, with reference to FIGS. 2 through 4C, is a circuit diagram of the equivalent circuit of DAB 100 during the charge phase of the flyback timing cycle. DC source 160 is connected to DAB equivalent circuit 400 at terminals 140, 142. Primary winding 130$_1$ is connected to DC source 160 through input terminals 140, 142, closed switches 110, 116, and inductor 132. Secondary winding 131$_2$ is open circuit since switches 120, 122, 124 are open.

The magnetisation inductance 133 of transformer 130 is shown in FIG. 5A to clarify the operation of the flyback mode. The current drawn by a transformer's magnetisation inductance 133 represents the current required to magnetise the transformer's core. A transformer's magnetisation inductance is conventionally modelled as being in parallel with the transformer's primary winding. Transformers are normally designed to maximize the value of $L_M$ since the greater the value of $L_M$, the smaller the storage current. For flyback mode operation however, a small value of $L_M$ could be useful to increase energy storage during the charge phase.

Figure 5B:
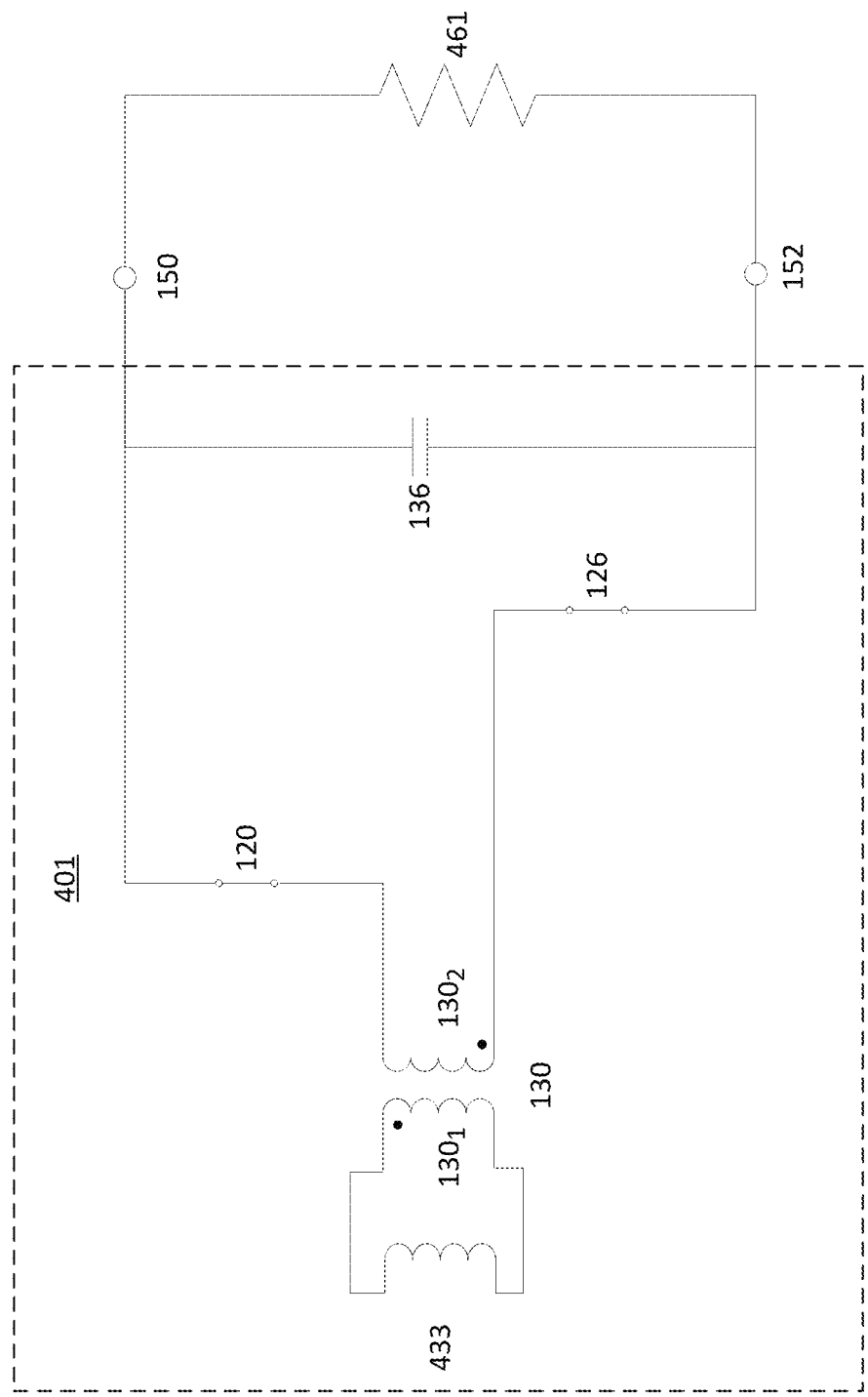
FIG. 5B is a schematic diagram of the equivalent circuit of the DAB during the discharge phase of the flyback timing cycle according to an embodiment herein.

FIG. 5B, with reference to FIGS. 2 through 5A, is a schematic diagram of the equivalent circuit of the DAB 100 during the discharge phase of the flyback timing cycle. Load 461 is connected to DAB equivalent circuit 401 at output terminals 150, 152. The energy stored in magnetisation inductance 133 during the charge phase is now transferred into secondary winding $130_2$. Magnetisation inductance 133 discharges and current flows into capacitance 136 and into load 461 through closed switches 120, 126. Power is transferred from DC voltage source 160 to load 461 on every flyback timing cycle.

DAB 100 can be operated in a continuous, discontinuous, or boundary flyback mode. One embodiment herein avoids operating the DAB 100 in a continuous mode to avoid saturating the transformer 130. If the transformer's magnetisation inductance does not discharge completely then energy could accumulate in the transformer until reaches saturation. When a transformer saturates, further increases in its primary current no longer increase its stored energy, thereby resulting in losses.

In discontinuous flyback mode, the magnetisation inductance 133 discharges completely before the next charge phase begins. In discontinuous flyback mode, the discharge phase ends with the discharge of the magnetisation inductance 133. In boundary flyback mode, the next charge phase begins at substantially the same time as the magnetisation inductance 133 has discharged completely.

The switches (110, 112, 114, 116, 120, 122, 124, 126) in DAB 100 can be implemented using a variety switching devices including bipolar transistors, Insulated Gate Bipolar transistors (IGBTs), diodes, relays, or P-type or N-type Metal Oxide Semiconductor Field Effect Transistors (MOSFETs), for example.

Figure 6:
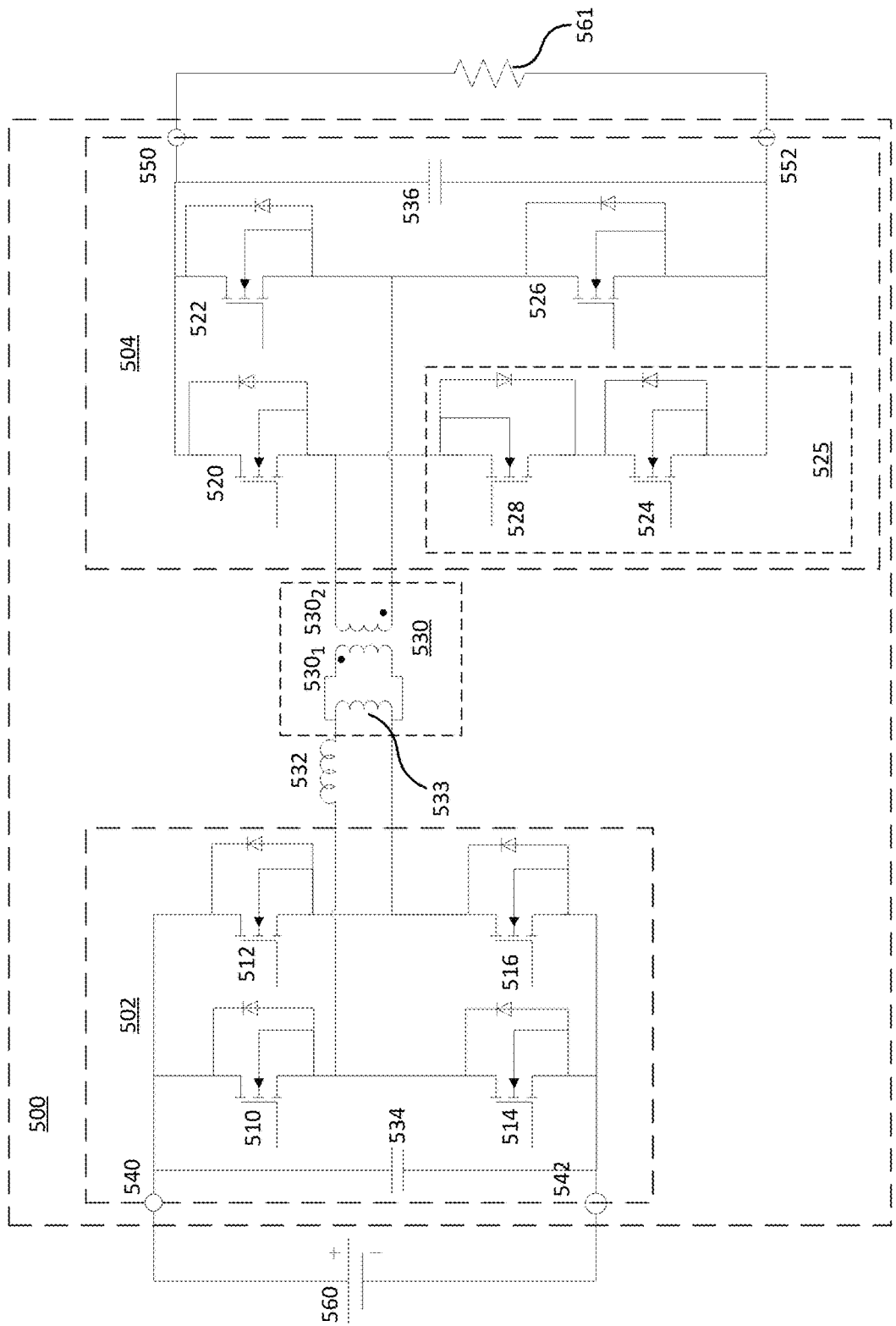
FIG. 6 is a schematic diagram of a DAB using N-type MOSFET switches according to an embodiment herein.

FIG. 6, with reference to FIGS. 2 through 5B, is a schematic diagram of a DAB 500 using N-type MOSFET switches (described below). DAB 500 comprises input converter 502, output converter 504, transformer 530, and inductor 532. DAB 500 operatively connects to DC source 560 at input terminals 540, 542 and to load 561 at output terminals 550, 552. Input converter 502 comprises N-type MOSFETs 510, 512, 514, 516 and input capacitor 534. MOSFETs 510, 512, 514, 516 are operatively connected in a bridge configuration with transformer 530. Output converter 504 comprises N-type MOSFETs 520, 522, 524, and bi-directional MOSFET switch 525 and output capacitor 536. MOSFETs 520, 522, 524 and bi-directional switch 525 are operatively connected in a bridge configuration with transformer 530. Bi-directional switch 525 comprises N-type MOSFETS 524, 528. In one embodiment, MOSFETS 528 and 524 share a common gate control signal. Transformer 530 comprises primary winding $530_1$, secondary winding $530_2$, and magnetisation inductance 533.

Inductor 532 could be a discrete inductor. In some embodiments however, inductor 532 might not be a discrete inductor and could instead be the leakage inductance of transformer 530. In other embodiments inductor 532 might be a combination of a discrete inductor and the leakage inductance of transformer 530.

Each MOSFET 510, 512, 514, 516, 520, 522, 524, 526, 528 in FIG. 6 contains an intrinsic diode between its source and drain. This diode is formed by the P-type body of the MOSFET and its N-type drain. This diode prevents a single N-type MOSFET from being a bi-directional switch. A bi-directional switch is capable of blocking current flow into or out of the switch. A bi-directional switch serially connected to secondary winding $530_2$ could ensure that secondary winding $530_2$ is isolated during the charge phase of the flyback timing cycle in flyback mode. If secondary winding $530_2$ is not isolated, then secondary current could flow and magnetisation inductance 533 might not charge and store energy. A variety of bi-directional switches are possible in accordance with the embodiments herein. In FIG. 6, bi-directional switch 525 comprises drain connected N-type MOSFETs 524, 528 and is capable of blocking current in both directions. In one embodiment, MOSFETS 524, 528 share a common gate control signal.

Figure 7B:
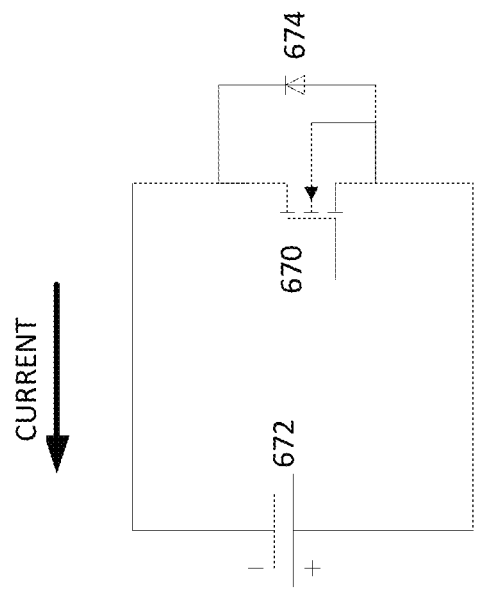
FIG. 7B is a schematic diagram of an N-type MOSFET with its drain and source connected to the negative and positive terminals of a DC source, respectively according to an embodiment herein.
Figure 7A:
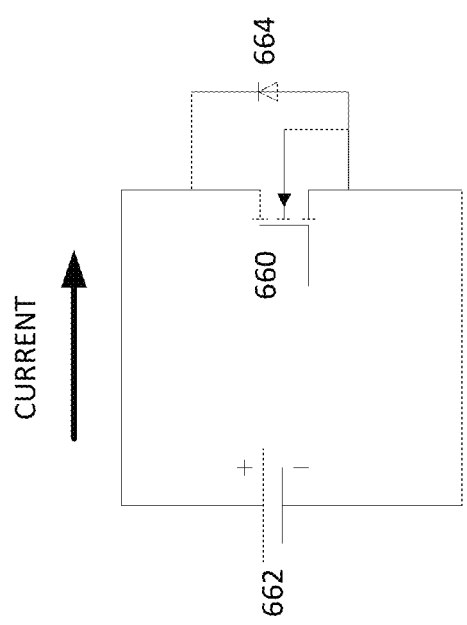
FIG. 7A is a schematic diagram of an N-type MOSFET connected to the positive and negative terminals of a DC source, respectively according to an embodiment herein.

FIG. 7A, with reference to FIGS. 2 through 6, is a schematic diagram of an N-type MOSFET 660 operatively connected to the positive and negative terminals of DC source 662, respectively. MOSFET 660 can control the current flow from DC source 662 since intrinsic diode 664 is anti-parallel to the direction of DC current flow. FIG. 7B, with reference to FIGS. 2 through 7A, is a schematic diagram of an N-type MOSFET 670 with its drain and source connected to the negative and positive terminals of a DC source 672, respectively. In this configuration MOSFET 670 cannot control the current flow from DC source 672 since intrinsic diode 674 is parallel to the direction of DC current flow and will provide a conduction path regardless of the conductive state of MOSFET 670.

Figure 8A:
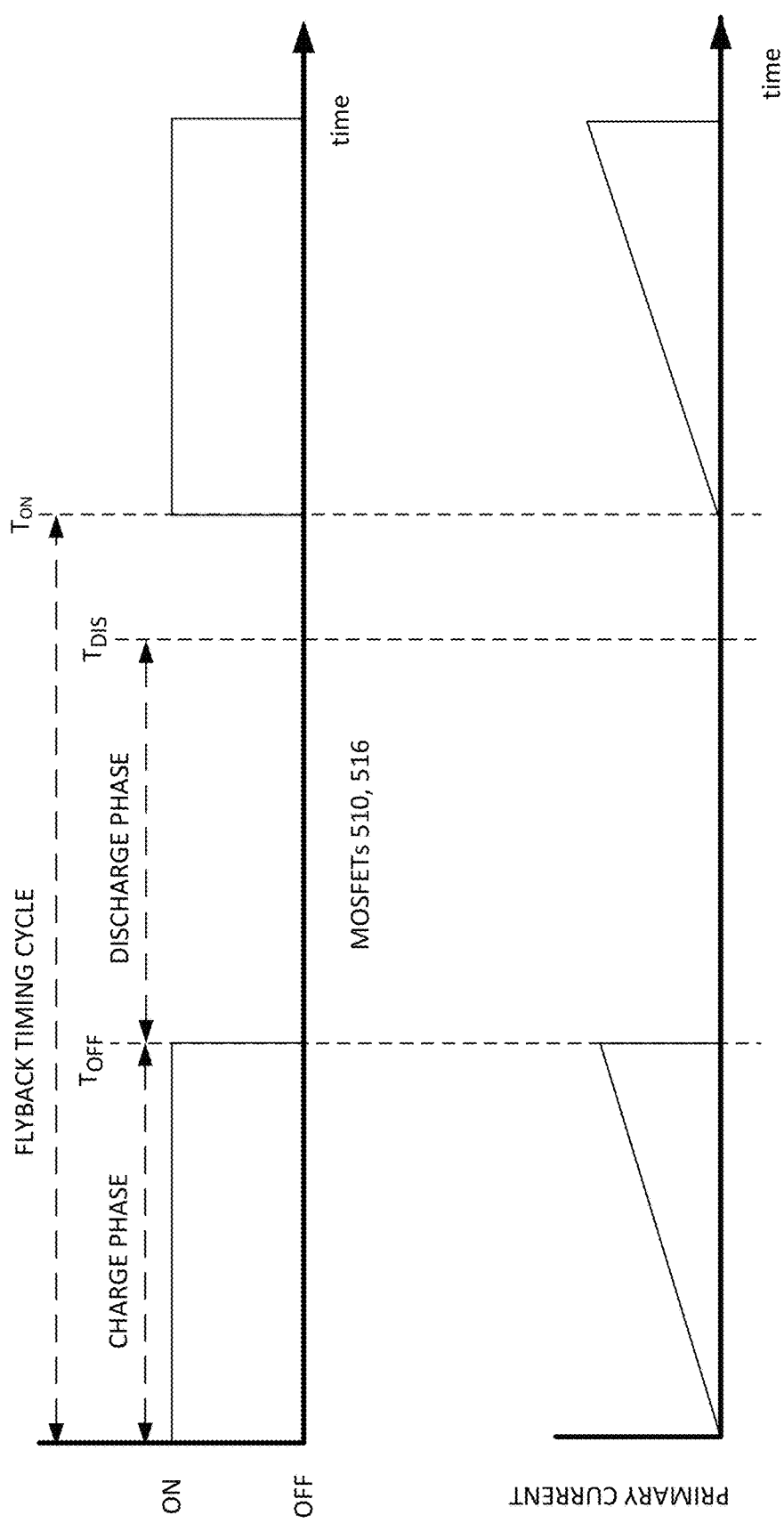
FIG. 8A is a switch control signal timing diagram for operation of a DAB with MOSFET switches in flyback mode according to a first embodiment of a reduced active switch method.

FIG. 8A, with reference to FIGS. 2 through 7B, is a control signal timing diagram for operation of a DAB 500 with MOSFET switches in flyback mode according to a first embodiment of a reduced active switch method. FIG. 8A shows control signals for MOSFETs 510, 516 for operation of DAB 500. The beginning of the flyback timing cycle is referred to as the charge phase. During the charge phase MOSFETs 510 and 516 are "ON" and the primary winding of transformer 530 is coupled to the DC input supply 560. MOSFETs 512, 514 520, 522, 526 and bi-directional switch 525 are "OFF" throughout the entire flyback timing cycle and their control signals have not been shown in the figures.

FIG. 8A also shows the current in winding $530_1$ of DAB 500 during the flyback timing cycle. The current in primary winding $530_1$ increase linearly with time during the charge phase. Energy is stored in magnetisation inductance 533 of transformer 530 and in leakage inductance 532. At time "$T_{OFF}$" in FIG. 8A the charge phase of the flyback timing cycle ends and the discharge phase of the flyback timing cycle begins. MOSFETS 510, 516 are turned "OFF". MOSFETS 512, 514, 520, 522, 525, 526 remain "OFF". The discharge phase last until time $T_{DIS}$. A new flyback timing cycle begins at time $T_{ON}$.

Figure 8B:
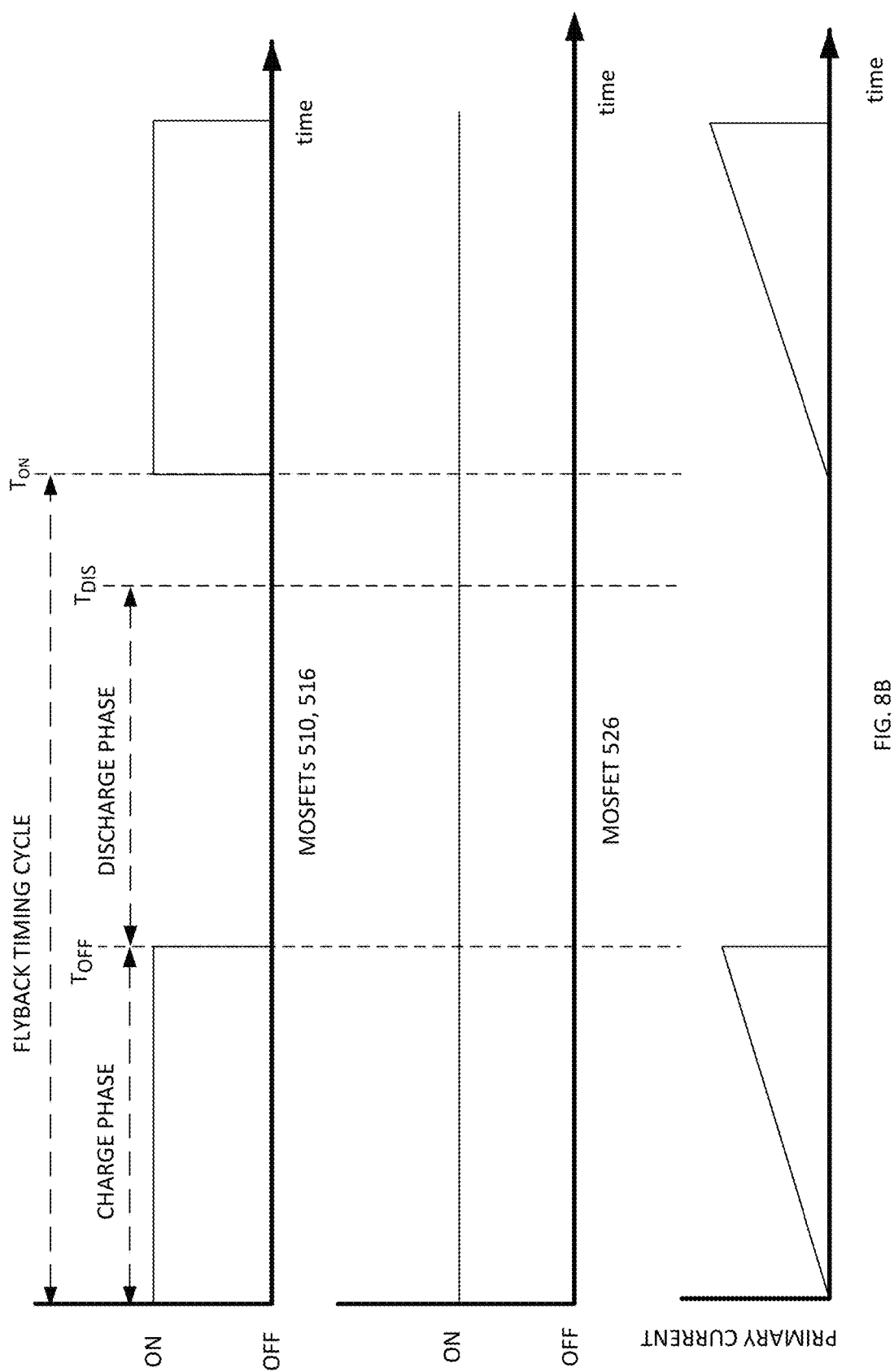
FIG. 8B is a switch control timing diagram for operation of a DAB with MOSFET switches in flyback mode according to a second embodiment of a reduced active switch method.

FIG. 8B, with reference to FIGS. 2 through 8A, is a control signal timing diagram for operation of a DAB 500 with MOSFET switches in flyback mode according to a second embodiment of a reduced active switch method. FIG. 8B shows control signals for MOSFETs 510, 516, 526 for operation of DAB 500. During the charge phase MOSFETs 510 and 516 are "ON" and primary winding $530_1$ of transformer 530 is coupled to the DC input supply 560. MOSFET 526 is ON. MOSFETs 512, 514 520, 522 and bi-directional switch 525 are "OFF" throughout the entire flyback timing cycle and their control signals have not been shown. FIG. 8B also shows the current in winding $530_1$ of DAB 500 during the flyback timing cycle. The current in primary winding $530_1$ increase linearly with time during the charge phase. Energy is stored in magnetisation inductance 533 of transformer 530 and in leakage inductance 532. At time "$T_{OFF}$" in FIG. 8B the charge phase of the flyback timing cycle ends and the discharge phase of the flyback timing cycle begins. MOSFETS 510, 516 are turned "OFF". MOSFETS 526 remains "ON". The discharge phase last until time $T_{DIS}$. A new flyback timing cycle begins at time $T_{ON}$.

Figure 9A:
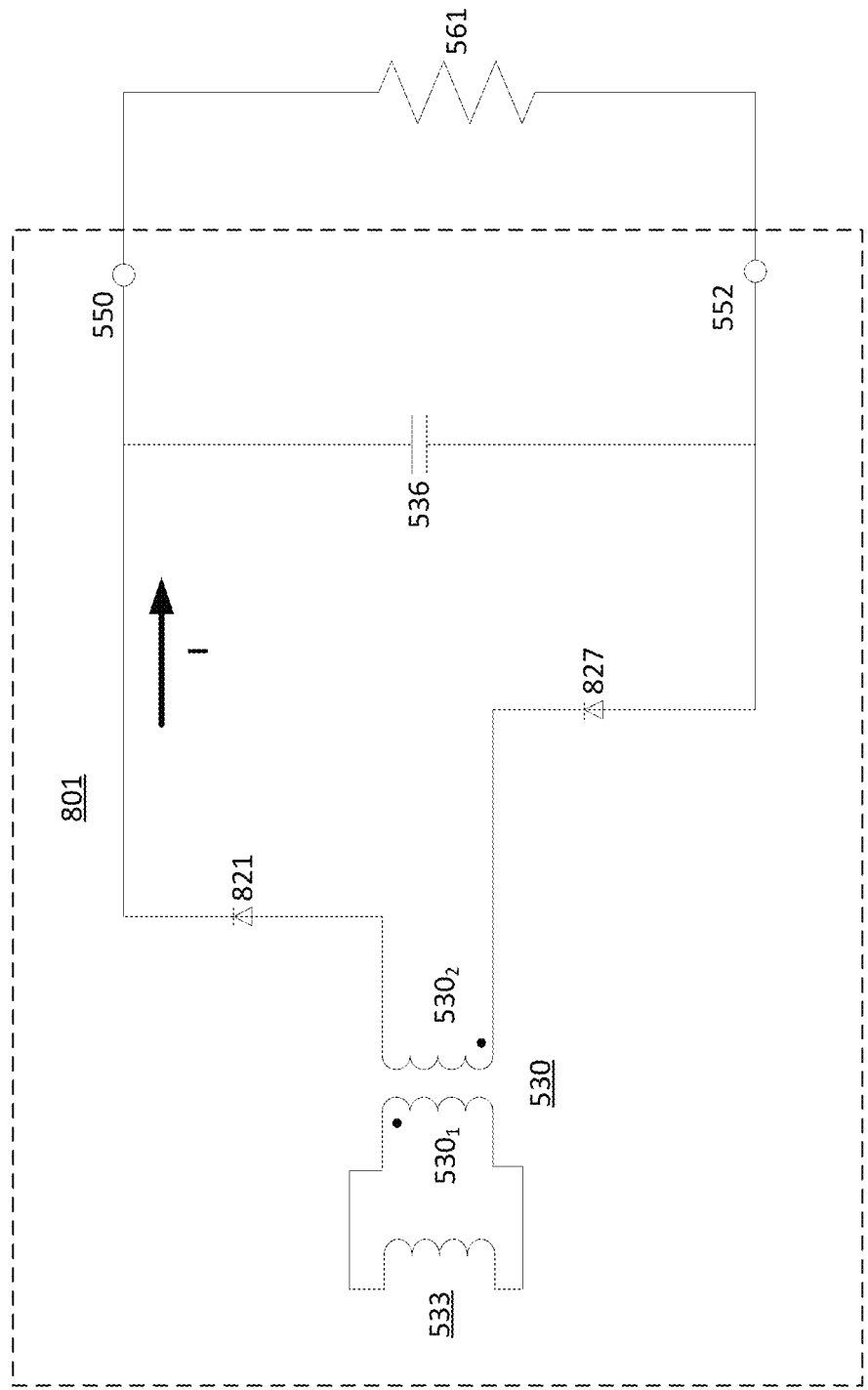
FIG. 9A is a schematic diagram of the equivalent circuit of a DAB during the discharge phase of the flyback timing cycle according to a first embodiment of a reduced active switch method.

FIG. 9A, with reference to FIGS. 2 through 8B, is a schematic diagram of the equivalent circuit 801 of DAB 500 during the discharge phase of the flyback timing cycle according to a first embodiment of a reduced active switch method. DAB equivalent circuit 801 comprises transformer 530, magnetisation inductance 533, output capacitor 536, and diodes 821, 827. Diodes 821, 827 are the intrinsic diodes of MOSFETs 520, 526 of FIG. 6 and become forward biased at the beginning of the discharge phase by the action of magnetisation inductance 533. Diodes 821, 827 provide a conduction path to couple secondary winding 530₂ to load 561 and capacitance 536. To ensure forward biasing of diodes 821, 827 the output voltage of the converter ($V_{OUT}$), which appears across output terminals 550, 552, should be kept less than the transformed voltage of input voltage source 560. The transformed voltage of input voltage source is $NV_{IN}$ where N is the turns ratio of transformer 530 and $V_{IN}$ is the input voltage. $V_{OUT}$ can be controlled by controlling the duty cycle of the flyback.

The energy stored in magnetisation inductance 533 during the charge phase is transferred into secondary winding 530₂. Magnetisation inductance 533 discharges and current flows into capacitance 536 and load 561. The energy stored in inductance 532 during the charge phases is recirculated back into capacitor 534 through the intrinsic body diodes of MOSFETS 512, 514 and does not contribute to the converter's power transfer. The recirculating action of inductance 532 and the intrinsic body diodes is a known aspect of the operation of a two transistor flyback and has not been shown in equivalent circuit 801 for clarity.

Figure 9B:
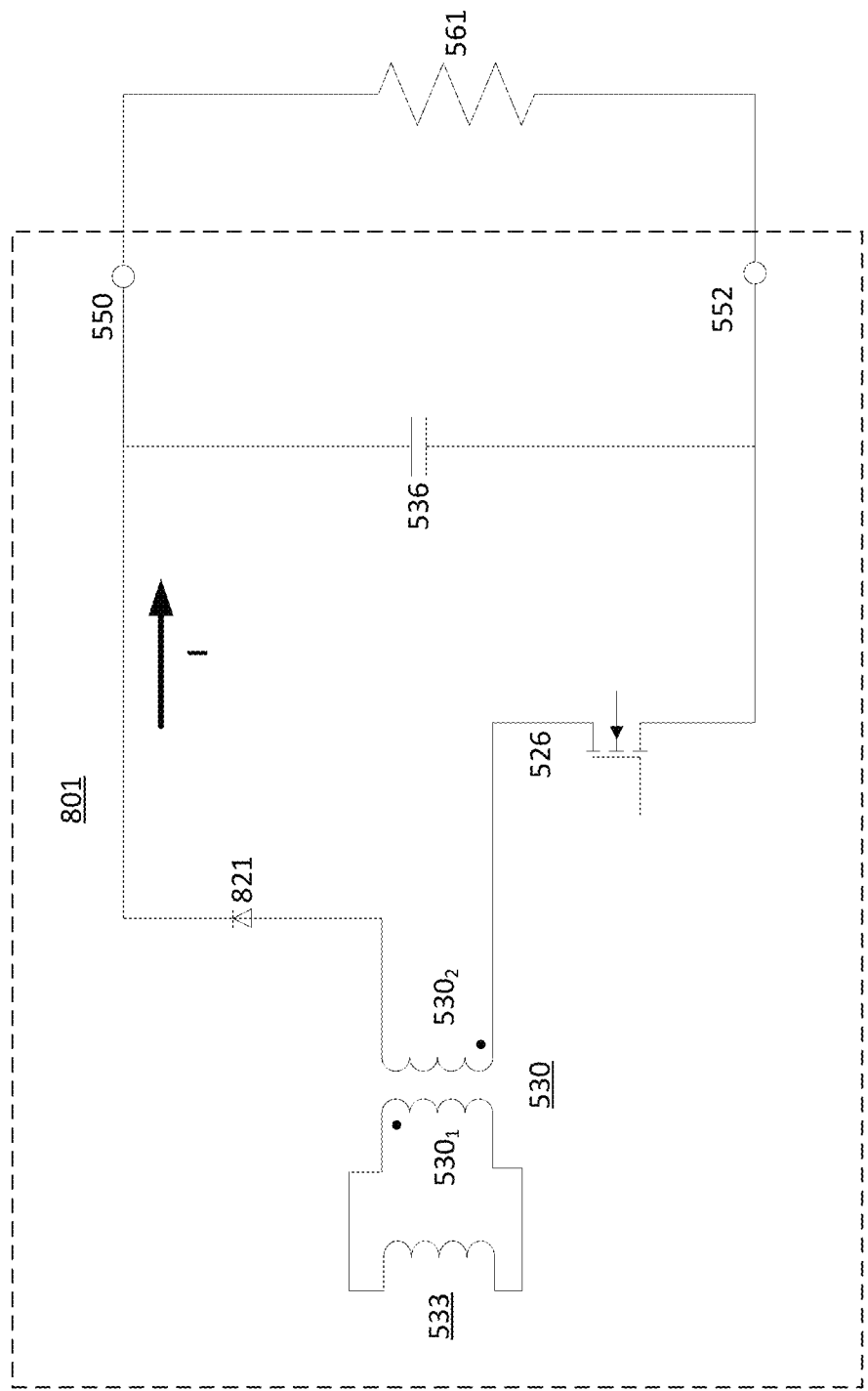
FIG. 9B is a schematic diagram of the equivalent circuit of a DAB during the discharge phase of the flyback timing cycle according to a second embodiment of a reduced active switch method.

FIG. 9B, with reference to FIGS. 2 through 9A, is a schematic diagram of the equivalent circuit 801 of DAB 500 during the discharge phase of the flyback timing cycle according to a second embodiment of a reduced active switch method. DAB equivalent circuit 801 comprises transformer 530, magnetisation inductance 533, output capacitor 536, MOSFET 520 and diode 821. Diode 821 is the intrinsic diodes of MOSFET 520 of FIG. 6 and becomes forward biased at the beginning of the discharge phase by the action of magnetisation inductance 533. Diode 821 and MOSFET 526 provide a conduction path to couple secondary winding 530₂ to load 561 and capacitance 536. Although MOSFET 526 is described as being kept "ON" throughout the flyback cycle and diode 821 is described as becoming forward biased during the discharge phase the opposite type of operation is also possible. MOSFET 520 could be kept "ON" throughout the flyback timing cycle with MOSFET 526 kept "OFF" throughout the entire flyback timing cycle and body diode 827 of MOSFET 526 could become forward biased during the discharge phase.

DAB 500 can be operated in a continuous, discontinuous or boundary flyback mode. In continuous flyback mode the magnetisation inductance does not discharge completely during the discharge phase before the next charge phase begins. It could be beneficial to avoid operating the DAB 500 in a continuous flyback mode to avoid saturating the transformer 530 as previously described.

In discontinuous flyback mode, the magnetisation inductance 533 discharges completely before the next charge phase begins. In discontinuous flyback mode, the discharge phase ends with the discharge of the magnetising inductance 533. DAB 500 then enters a resonance phase. In boundary flyback mode, the next charge phase begins at substantially the same time as the magnetisation inductance 533 has discharged completely.

Figure 10:
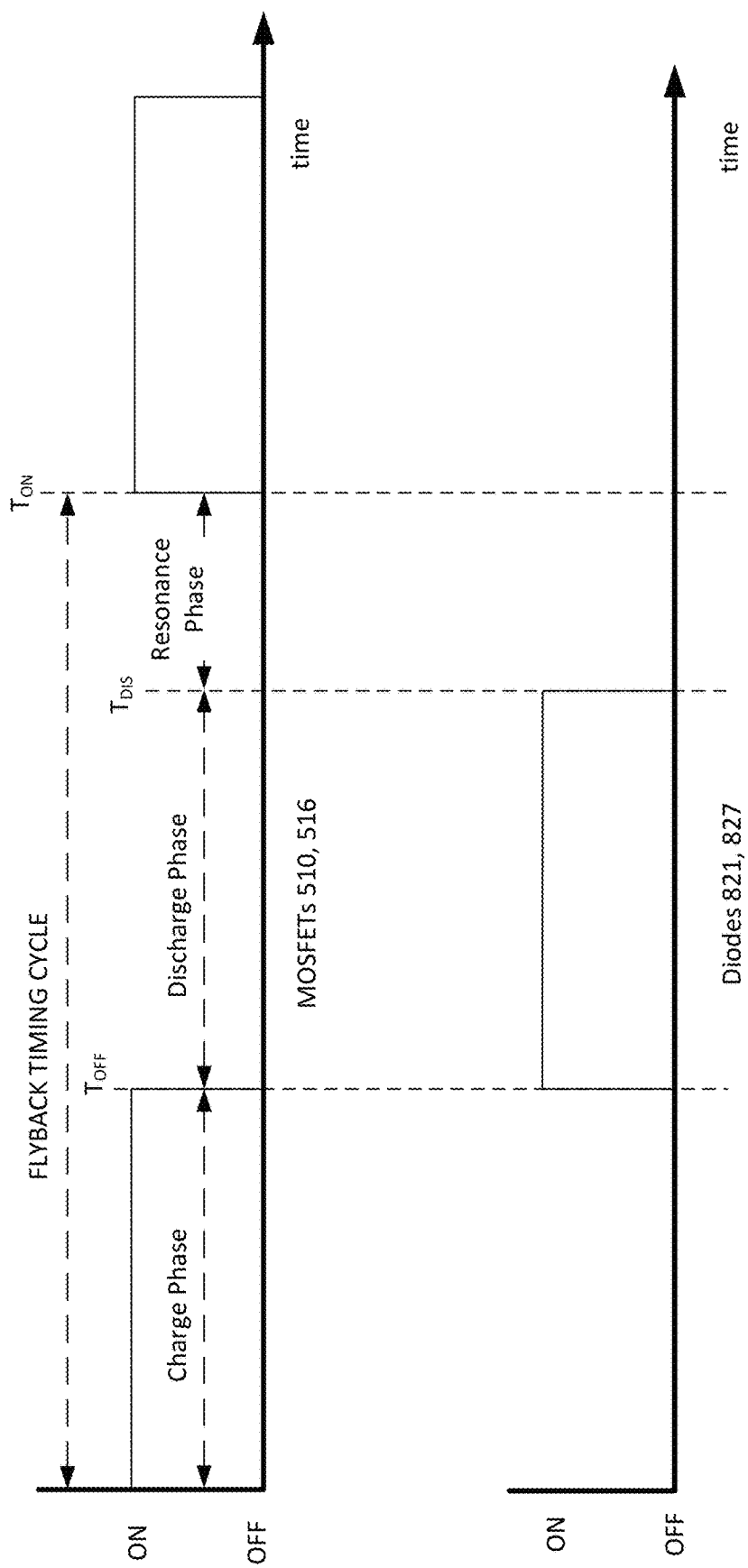
FIG. 10 is a timing diagram showing switch control signals and diode conductive states for a DAB using N type MOSFET switches in discontinuous flyback mode according to an embodiment herein.

FIG. 10, with reference to FIGS. 2 through 9B, is a timing diagram showing switch control signals and diode conductive states for a DAB 500 using N type MOSFET switches operated in discontinuous flyback mode according to a first reduced active switch method. FIG. 10 shows the control signals of MOSFETs 510, 516 and the conductive states of diodes 821, 827. At time $T_{DIS}$ magnetisation inductance 533 has discharged completely and diodes 821, 827 become reverse biased and stop conducting ("OFF"), isolating secondary winding 530₂. When DAB 500 is operated according to the second embodiment of a reduced active switch scheme, one of diode 821 or 827 becomes reverse biased at the end of the discharge phase, stops conducting and isolates secondary winding 530₂.

With the isolation of secondary winding 530₂ the discharge phase of the flyback timing cycle ends and the resonance phase of the flyback timing cycle begins. At a further time $T_{ON}$ MOSFETs 510, 516 are turned "ON" and the next charge phase begins.

Neglecting the effect of inductor 532, the power flow $P_{conv}$ in flyback mode is:

$$P_{conv} = \frac{(V_{IN}D)^2}{2f_s L_M}$$

where $f_S$, is the switching frequency of the converter ($1/T_{ON}$), $L_M$ is value of magnetisation inductance 533, $V_{IN}$ is the input voltage of DC source 560, and D is the duty factor where D is given by the formula:

$$D = T_{OFF}/T_{ON}$$

where $T_{OFF}$ and $T_{ON}$ are as shown in FIGS. 8A and 8B.

Figure 11:
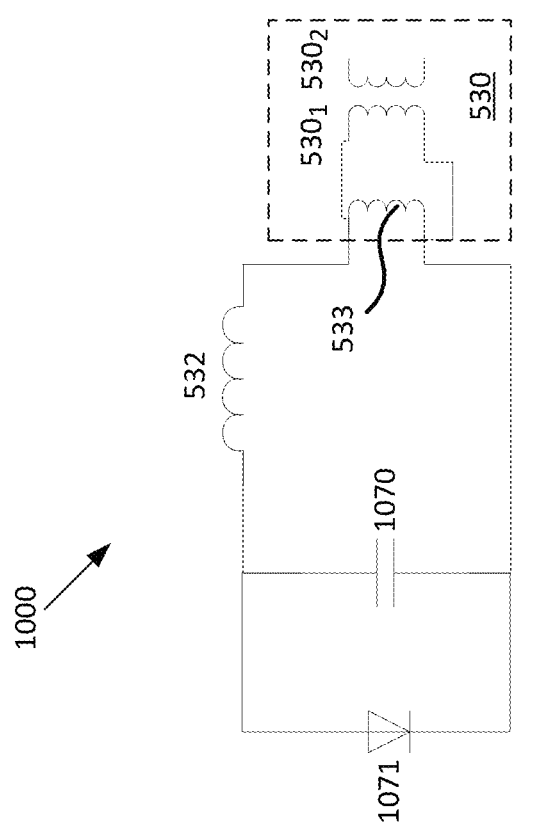
FIG. 11 is a schematic diagram of the equivalent circuit of the DAB during the resonance phase according to an embodiment herein.

FIG. 11, with reference to FIGS. 2 through 10, is a schematic of the equivalent circuit 1000 of the DAB 500 in resonance phase after the magnetisation inductance 533 has discharged. Equivalent circuit 1000 comprises transformer 530, magnetisation inductance 533, equivalent diode 1071, and equivalent capacitance 1070. Equivalent capacitance 1070 and equivalent diode 1072 represents the parasitic capacitances and body diodes of MOSFETs 510, 512, 514, 516. Equivalent capacitance 1070 is predominantly the source-drain capacitance of MOSFETs 510, 512, 514, 516. Secondary winding 530₂ is open circuit from the reverse biasing of diodes 821, 827.

Capacitance 1070 will resonate with magnetisation inductance 533 and inductance 532 with a period "$T_{RES}$" given by the equation:

$$T_{RES} = 2\pi\sqrt{C_{EQ}L_{EQ}}$$

where $C_{EQ}$ is the value of capacitance 1070 and $L_{EQ}$ is the sum of inductances 532 and 533. The voltage across equivalent capacitance 1070 will have a sinusoidal variation. It could be beneficial to the efficiency of the converter to time the beginning of the next charge phase ($T_{ON}$) to correspond with a minimum in this voltage. Referring to FIG. 6, when MOSFETs 510, 516 are turned "ON" at the start of the charge phase their source and drain regions are shorted together and any energy stored in their source-drain capacitance is dissipated. Since the energy stored in a capacitor is proportional to the square of its voltage it could be beneficial to turn MOSFETs 510, 516 "ON" when the voltage across them is a minimum. This technique is analogous to the technique of valley switching commonly used in a conventional flyback converter.

Figure 12:
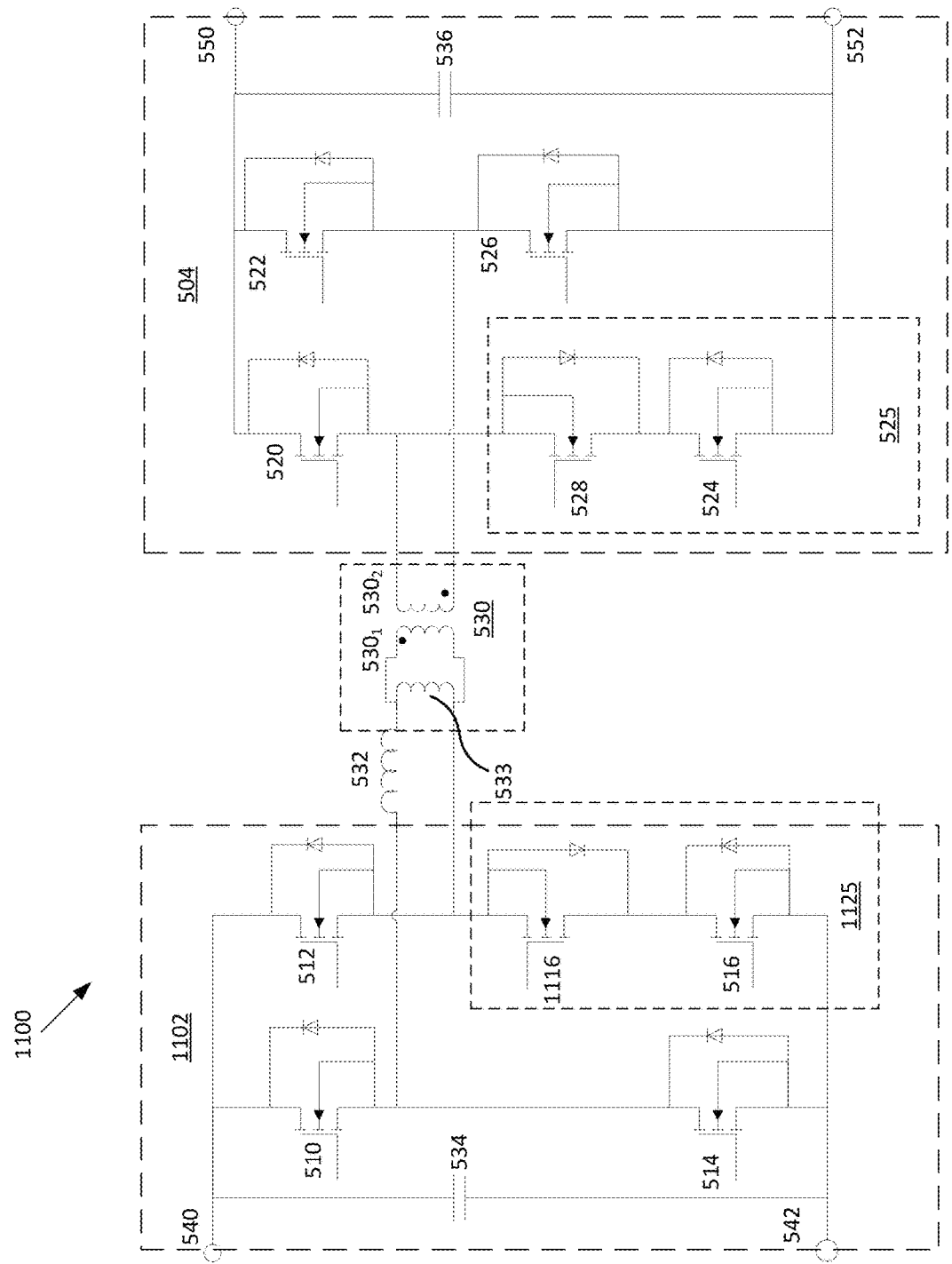
FIG. 12 is a schematic diagram of a DAB suitable for bi-directional flyback operation according to an embodiment herein.

FIG. 12, with reference to FIGS. 2 through 11, is a schematic diagram of a DAB 1100 suitable for bi-directional flyback operation. In bi-directional operation power can flow in the converter in both directions. Bi-directional converters are commonly used with rechargeable electrical storage devices such as batteries in which the battery may source or sink energy. DAB 1100 comprises an additional bi-directional switch 1125 capable of blocking current on primary side converter 1102. Switch 1125 comprises MOSFETs 516, 1116. DAB 1100 is capable of converting DC power supplied to terminals 550, 552 to DC power at terminals 540, 542 as well as converting power supplied to terminals 540, 542 to power at terminals 550, 552.

The foregoing flyback mode exhibits several advantages over normal DAB mode for low power conditions, including less switching and gate-drive losses (e.g., two switching devices versus eight in the DAB mode). Unlike the more conventional single transistor flyback topology, the body diodes of MOSFETS 512 and 514 clamp the drain voltage on the switching devices 510 and 516, which reduces Electromagnetic Interference (EMI) and limits the blocking voltage rating on the primary switches to $V_{IN}$. In applications requiring a high step-up ratio, the 2T-flyback mode could be operated with fixed duration charge time ($T_{CHAR}$), in Pulse Frequency Modulation (PFM) mode, as shown in FIG. 13.

Figure 13:
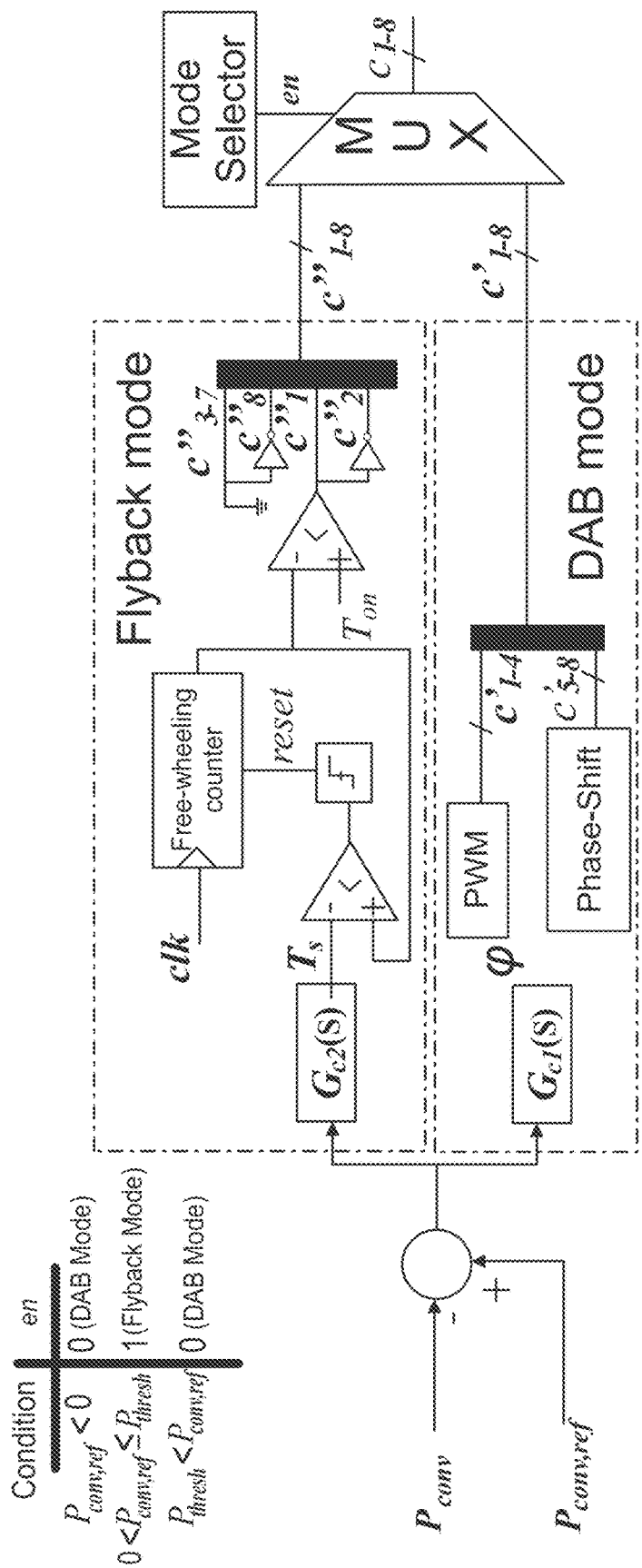
FIG. 13 is a schematic diagram of a control diagram showing the DAB mode and flyback mode according to an embodiment herein.

FIG. 13 with reference to FIGS. 1 to 12 is block level diagram of the control signal generation circuitry for a DAB suitable for bi-directional flyback operation. Flyback mode is selected when the power is between zero and a threshold power value $P_{thresh}$. $P_{thres}$ could represent the maximum power level at which flyback mode is more efficient than regular DAB mode. The multiplexer (MUX) is a control mechanism that selects between DAB mode control signals and flyback mode control signals. Control signals c1 to c8 control MOSFETS 510, 512, 514, 516, 520, 522, bi-directional switch 525 and MOSFET 526 respectively. Other methods to select between regular DAB mode and flyback mode are possible. The flyback mode could be selected based on a current threshold.

Figure 14:
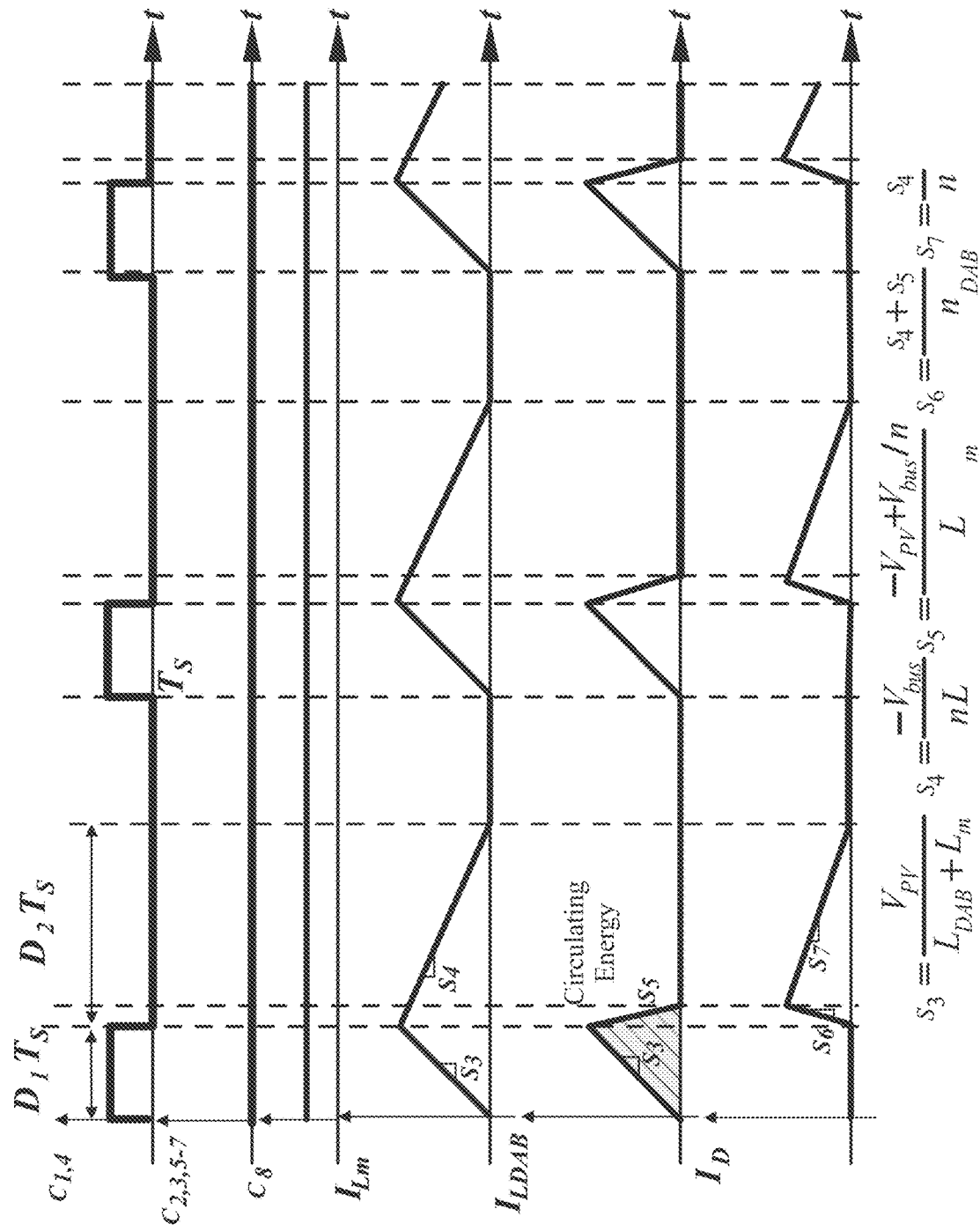
FIG. 14 is a switching waveform diagram in the 2T-flyback mode according to an embodiment herein.

The corresponding waveforms of the converter in flyback mode are shown in FIG. 14, with reference to FIGS. 2 through 13. In FIG. 14 $I_{LM}$ is the magnetising current, $I_{LDAB}$ is the current in inductance 532, $I_D$ is the secondary current TS is the switching period, $D_1T_S$ is the length of the charge phase and $D_2T_S$ is the length of the discharge phase. The presence of inductance 532 ($L_{DAB}$), which is needed for the DAB operation but is detrimental in flyback mode, results in some additional losses, since it stores and releases energy in a single switching cycle (e.g., FIG. 14). The energy captured in $L_{DAB}$ is transferred back to the input capacitance, 534 ($C_{in}$), in a 2T-flyback topology, as opposed to a conventional flyback scheme, which suffers from energy loss in leakage inductance. At the same time, $L_{DAB}$ could provide Zero-Current-Switching (ZCS) in the output diode, (diode 821 and or diode 827) by switching during the resonance phase as previously described.

Experimental Results

Figure 15A:
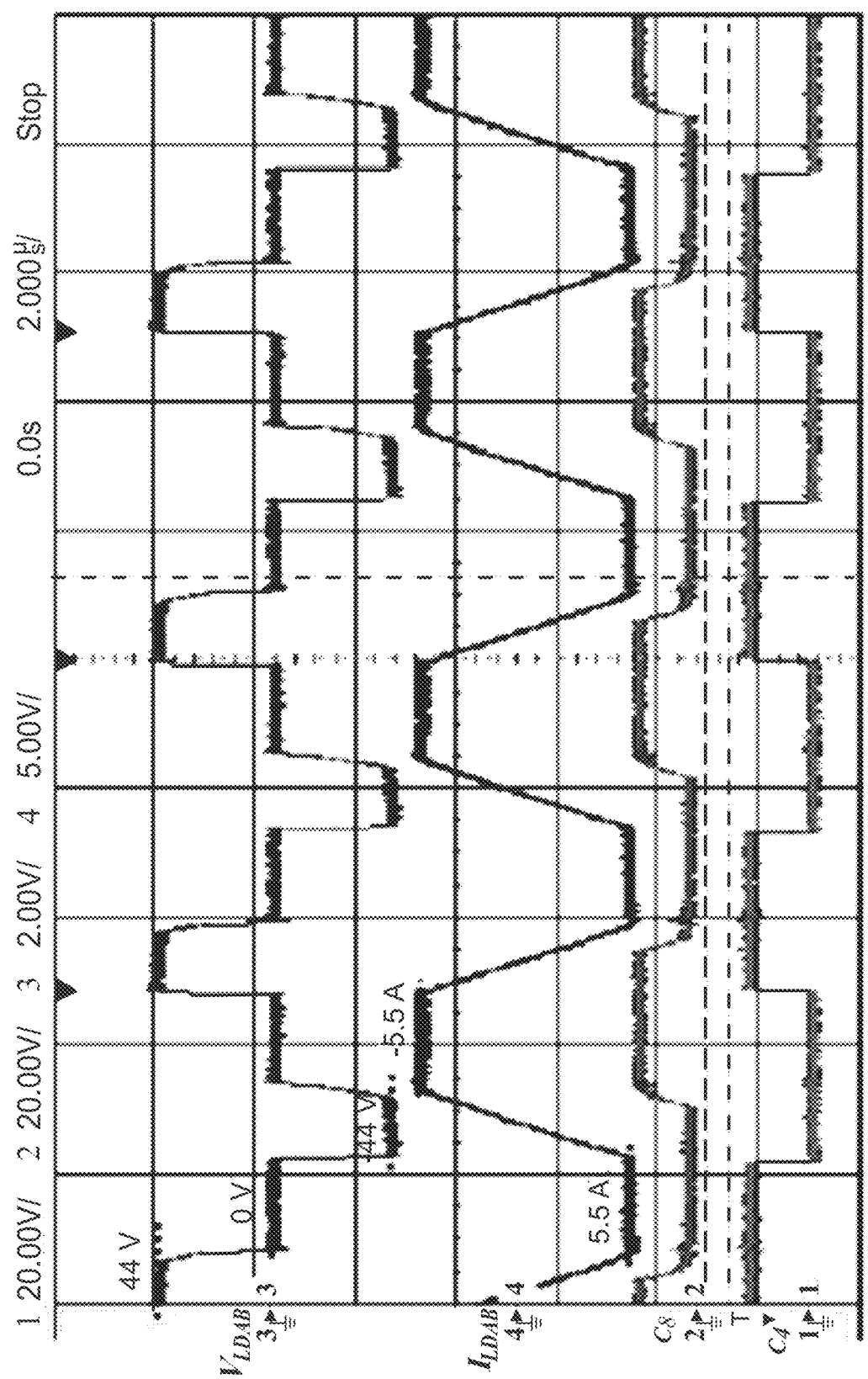
FIG. 15A is a steady-state waveform diagram of a converter operating in DAB mode according to an embodiment herein.
Figure 15B:
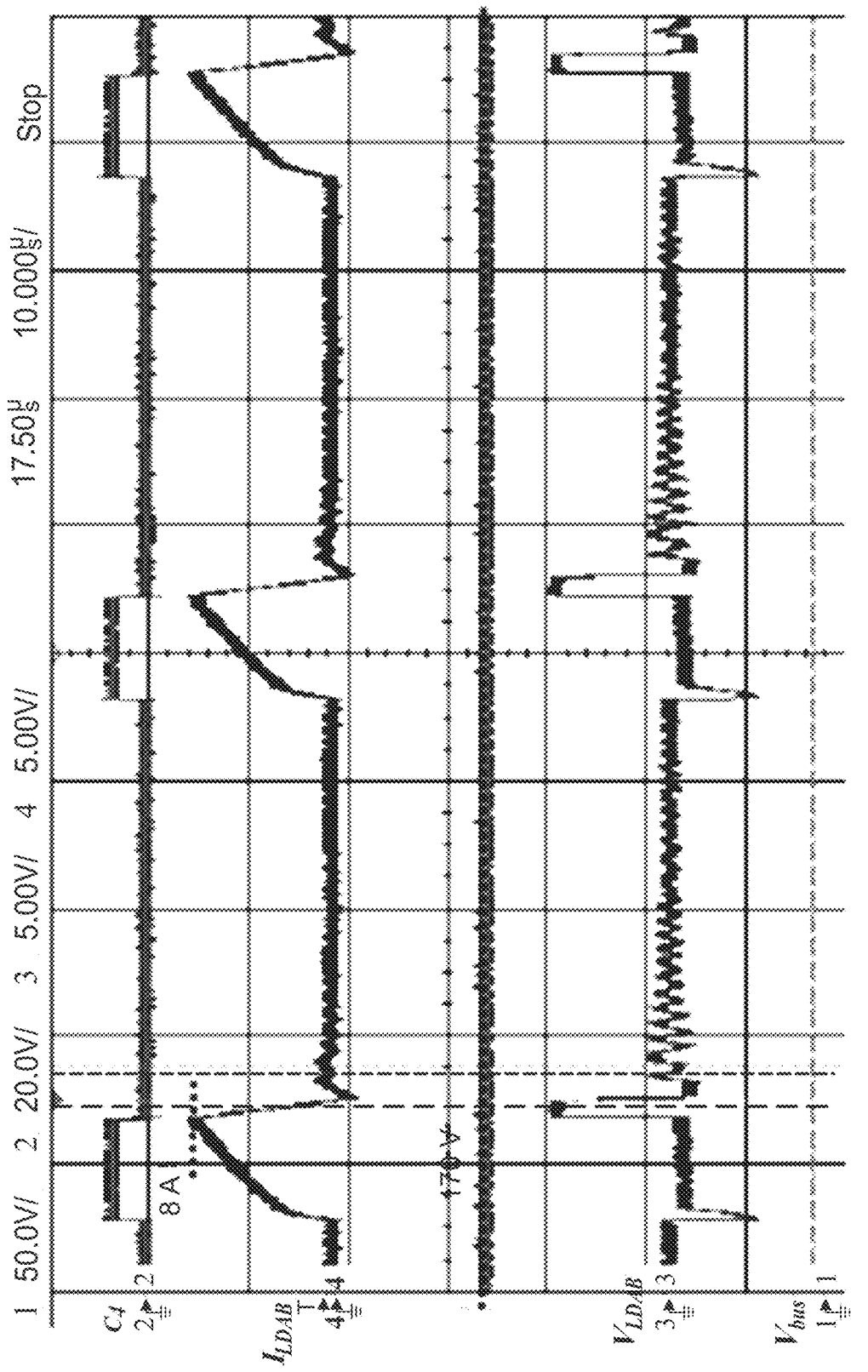
FIG. 15B is a steady-state waveform diagram of a converter operating in a 2T-flyback mode according to an embodiment herein.
Figure 16A:
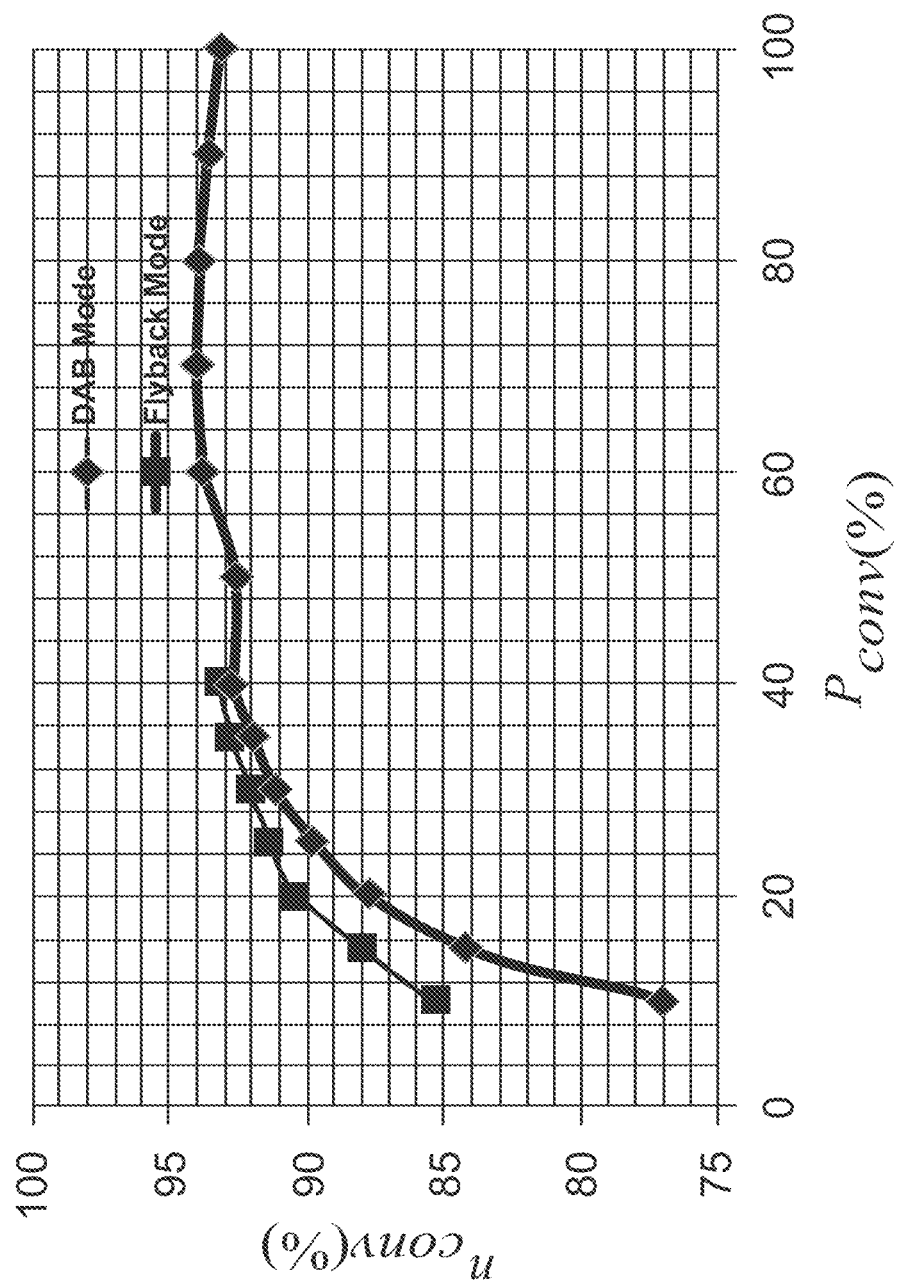
FIG. 16A is a graphical diagram illustrating the experimental efficiency, $\eta$, of the converter according to an embodiment herein.
Figure 16B:
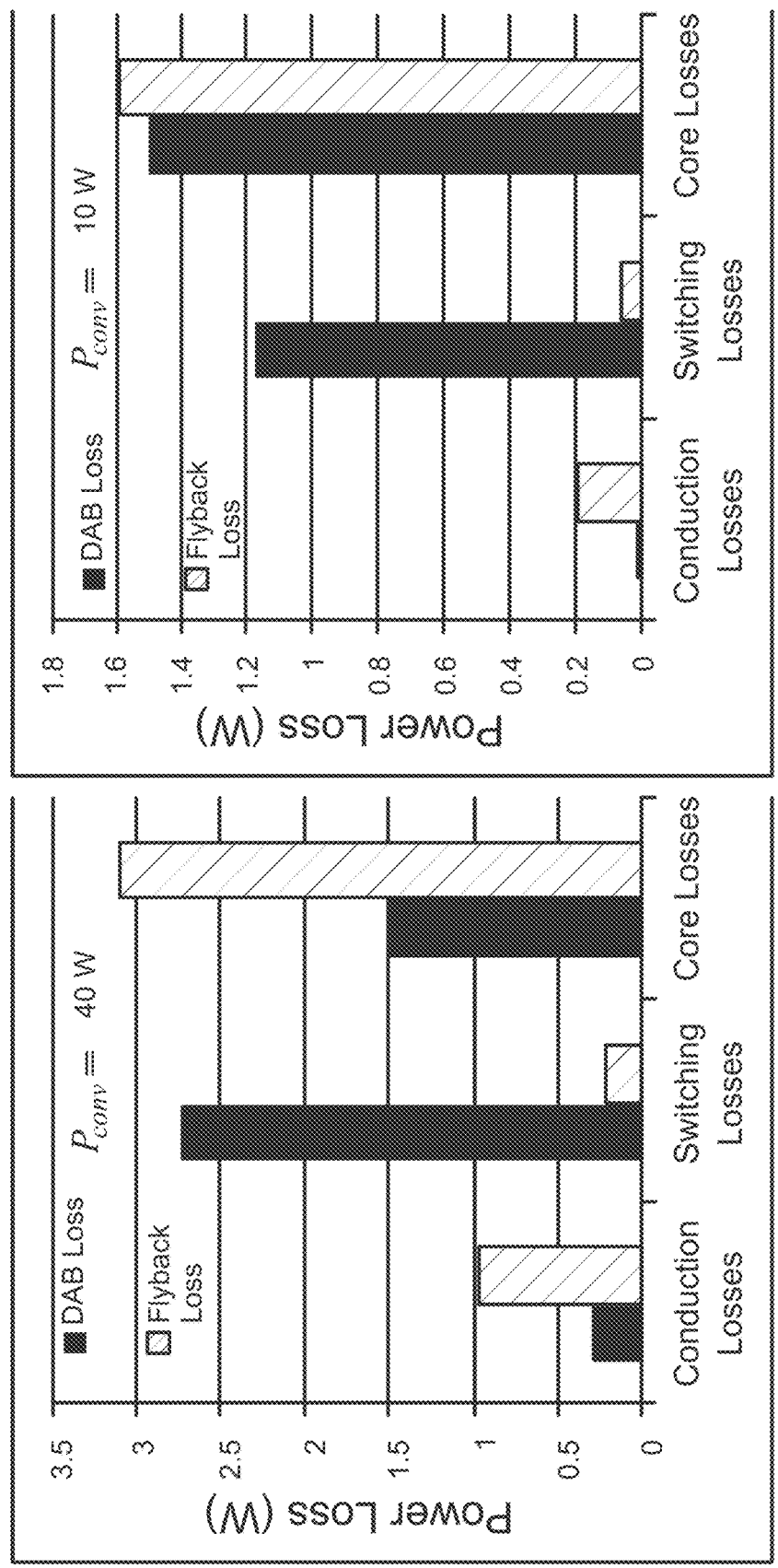
FIG. 16B is a graphical diagram illustrating simulated losses at different input powers according to an embodiment herein.

A 100 W DC-DC prototype can be fabricated on a custom printed circuit board (PCB) with the following example parameters: $f_s$=195 kHz (DAB mode), $f_s$=20-50 kHz (flyback mode), $T_{CHAR}$=8 µs, $C_{in}$=300 µF, $C_{bus}$=100 µF, n=9, $L_{DAB}$=4.2 µH, $L_m$=32 µH, $V_{pv}$=22-30 V, $V_{OUT}$=200-270 V (DAB mode), and $V_{OUT}$=170 V (flyback mode) where $C_{IN}$ is the value of input capacitor 524, $C_{BUS}$ is the value of output capacitor 536, $L_m$ is the value of magnetization inductance 533, $T_{CHAR}$ is the duration of the charge phase and n is the turns ratio of transformer 530. The converters are digitally controlled using an onboard field-programmable gate array (FPGA). The steady-state DAB and flyback waveforms at $P_{conv}$=70 W, and $P_{conv}$=15 W, are shown in FIGS. 15A and 15B, respectively, with reference to FIGS. 2 through 14. The efficiency of the two converters, $n_{conv}$, is shown in FIG. 16A, with reference to FIGS. 2 through 15B. The DAB mode achieves 94% efficiency, while the flyback mode has a superior efficiency up to $P_{conv}$=40 W. This power level is configured such that for the specific chosen value of $T_{CHAR}$, the converter achieves Boundary Conduction Mode (BCM) at the intersection of the two curves. The simulated loss breakdown for $P_{conv}$=10 W and 40 W are shown in FIG. 16B, with reference to FIGS. 2 through 16A.

The flyback mode reduces the switching losses by approximately 10 times, mostly by eliminating the switching action on the high voltage side, at a cost of marginal increase in conduction losses. The transformer and inductor's core loss is slightly higher in flyback mode, due to higher overall peak magnetic flux density, $B_{peak}$, as well as suboptimal performance of the cores at lower frequency. The core losses in flyback mode increases rapidly with the power due to higher $B_{peak}$ and $f_s$. This is not the case for the DAB converter, in which the core losses remain almost constant over the power range.

The embodiments herein generally provide a DAB topology for power regulation for renewable energy applications such as PV installations with distributed power electronics. The DAB isolated power topology provides bi-directional power flow, however it generally suffers from poor efficiency at low power levels. The DAB can be operated as a two-switch flyback converter at low power for improved efficiency. The embodiments herein are experimentally verified on a 100 W topology, leading to a 1% increase in European Efficiency index. Moreover, the topology enjoys 8% more efficiency than the conventional DAB topology at 10 W.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of operating a dual active bridge (DAB) converter in a power conversion operation, said method comprising controlling a plurality of bridge configured switches to charge a magnetisation inductance from an input supply during a charge phase of a power cycle and to discharge said magnetisation inductance into an output of said DAB during a discharge phase of said power cycle, wherein said DAB converter comprises:
    an input converter operatively connected to said input supply;
    an inductance operatively connected to said input converter;
    a transformer comprising a primary winding and a secondary winding, said transformer operatively connected to said inductance; and an output converter operatively connected to said transformer, wherein each of said input converter and said output converter comprises:
a first pair of switches forming a first circuit path; and
a second pair of switches forming a second circuit path parallel to said first circuit path, wherein said first circuit path and said second circuit path are both completed by a third circuit path, wherein the third circuit path of said input converter comprises said inductance and said primary winding of said transformer, wherein the third circuit path of said output converter comprises said secondary winding of said transformer, wherein during said charge phase of said power cycle, said first pair of switches and said second pair of switches of said output converter are all open and one of said first pair of switches and said second pair of switches of said input converter are closed, and wherein during said discharge phase of said power cycle, said first pair of switches and said second pair of switches of said input converter are all open and one of said first pair of switches and said second pair of switches of said output converter are closed.

2. The method of claim 1, further comprising configuring said inductance as any of a discrete inductor, a leakage inductance of said transformer, and a combination of a discrete inductor and a leakage inductance of said transformer.

3. The method of claim 1, wherein said input supply comprises a photovoltaic (PV) panel.

4. The method of claim 1, further comprising operating said DAB converter in said power cycle, wherein during said power cycle the first pair of switches and the second pair of switches in each of said input converter and said output converter are controlled to be active switches or inactive switches, wherein active switches are switched during said power cycle.

5. The method of claim 4, wherein the first pair of switches or the second pair of switches in said input converter are active switches, and wherein one of the second pair of switches in said output converter is an active switch.

6. The method of claim 1, further comprising controlling the switches to operate said DAB converter in a resonance phase, wherein said magnetising inductance resonates with a switch capacitance.

7. The method of claim 1, further comprising controlling a beginning of said charge phase to coincide with a minimum value in a switch capacitance voltage.

8. The method of claim 1, wherein said magnetisation inductance continuously charges or discharges, and wherein a next power cycle begins before the magnetisation inductance fully discharges.

9. The method of claim 1, wherein said magnetisation inductance continuously charges or discharges, and wherein a next power cycle begins substantially simultaneously as said magnetisation inductance is fully discharged.

10. The method of claim 1, wherein said magnetisation inductance fully discharges prior to a next power cycle.

11. The method of claim 1, wherein each of said input converter and said output converter comprises any of P-type and N-type metal-oxide-semiconductor field-effect transistors (MOSFETs) switches, and wherein said output converter further comprises a bi-directional switch.

12. The method of claim 11, wherein said bi-directional switch comprises any of a pair of P-type and N-type MOSFETS sharing a common gate control signal.

13. The method of claim 11, wherein each MOSFET comprises an intrinsic diode between a source and a drain of the MOSFET.

14. The method of claim 13, wherein a pair of MOSFETs in said input converter are active switches, and wherein a pair of intrinsic diodes in said output converter are active switches.

15. The method of claim 1, wherein said input converter further comprises a bi-directional switch.

16. The method of claim 1, further comprising:
operating said DAB converter in said power cycle; and
selecting a flyback mode of operation of said DAB converter when a power level of said DAB converter is between zero and a predetermined threshold power level value.

17. A dual active bridge (DAB) converter comprising:
a plurality of bridge configured switches configured to charge a magnetisation inductance from an input supply during a charge phase of a power cycle and to discharge said magnetisation inductance into an output of said DAB during a discharge phase of said power cycle;
an input converter operatively connected to said input supply;
an inductance operatively connected to said input converter;
a transformer comprising a primary winding and a secondary winding, said transformer operatively connected to said inductance; and
an output converter operatively connected to said transformer, wherein each of said input converter and said output converter comprises:
a first pair of switches forming a first circuit path; and
a second pair of switches forming a second circuit path parallel to said first circuit path, wherein said first circuit path and said second circuit path are both completed by a third circuit path, wherein the third circuit path of said input converter comprises said inductance and said primary winding of said transformer, wherein the third circuit path of said output converter comprises said secondary winding of said transformer, wherein during said charge phase of said power cycle, said first pair of switches and said second pair of switches of said output converter are all open and one of said first pair of switches and said second pair of switches of said input converter are closed, and wherein during said discharge phase of said power cycle, said first pair of switches and said second pair of switches of said input converter are all open and one of said first pair of switches and said second pair of switches of said output converter are closed.

18. The DAB converter of claim 17, wherein said inductance comprises any of a discrete inductor, a leakage inductance of said transformer, and a combination of a discrete inductor and a leakage inductance of said transformer.

19. The DAB converter of claim 17, wherein during said power cycle the first pair of switches and the second pair of switches in each of said input converter and said output converter are controlled to be active switches or inactive switches, and wherein active switches are switched during said power cycle.

20. The DAB converter of claim 19, wherein the first pair of switches or the second pair of switches in said input converter are active switches, and wherein one of the second pair of switches in said output converter is an active switch.

21. The DAB converter of claim 17, wherein each of said input converter and said output converter comprises N-type metal-oxide-semiconductor field-effect transistors (MOSFETs), and wherein any of said input converter and said output converter further comprises a bi-directional switch.

22. The DAB converter of claim 21, wherein said bi-directional switch in said input converter comprises a pair of N-type MOSFETS sharing a common gate control signal.

23. The DAB converter of claim 21, wherein each MOSFET comprises an intrinsic diode between a source and a drain of the MOSFET.

24. The DAB converter of claim 23, wherein a pair of MOSFETs in said input converter are active switches, and wherein a pair of intrinsic diodes in said output converter are active switches.

25. The DAB converter of claim 17, further comprising a control mechanism that selects a flyback mode of operation of said DAB converter when a power level of said DAB converter is between zero and a predetermined threshold power level value.

26. The method of claim 1, wherein said magnetisation inductance does not discharge into said output during said charge phase and does not charge from said input supply during said discharge phase.

27. The DAB converter of claim 17, wherein said magnetisation inductance does not discharge into said output during said charge phase and does not charge from said input supply during said discharge phase.

* * * * *